(12) United States Patent
Jin et al.

(10) Patent No.: US 11,575,882 B2
(45) Date of Patent: Feb. 7, 2023

(54) ELECTRONIC APPARATUS AND CONTROL METHOD THEREOF

(71) Applicant: SAMSUNG ELECTRONICS CO., LTD., Suwon-si (KR)

(72) Inventors: Bora Jin, Suwon-si (KR); Yeoul Lee, Suwon-si (KR); Jihye Lee, Suwon-si (KR); Kyungmin Lim, Suwon-si (KR); Jaesung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/135,247

(22) Filed: Dec. 28, 2020

(65) Prior Publication Data

US 2021/0203917 A1    Jul. 1, 2021

(30) Foreign Application Priority Data

Dec. 27, 2019  (KR) .................. 10-2019-0177062
Oct. 15, 2020  (KR) .................. 10-2020-0133303

(51) Int. Cl.
*H04N 13/395* (2018.01)
*H04N 13/122* (2018.01)
(Continued)

(52) U.S. Cl.
CPC ............. *H04N 13/395* (2018.05); *G06N 3/08* (2013.01); *G09G 3/001* (2013.01);
(Continued)

(58) Field of Classification Search
None
See application file for complete search history.

(56) References Cited

U.S. PATENT DOCUMENTS 8,848,006 B2    9/2014  Wetzstein et al.
8,997,021 B2 *  3/2015  Liang .................. G06F 3/04815
                                                345/473
(Continued)

FOREIGN PATENT DOCUMENTS

CN    109299976 A    2/2019
CN    109544621 A    3/2019
(Continued)

OTHER PUBLICATIONS

International Search Report and Written Opinion (PCT/ISA/210 and 237) dated Apr. 13, 2021, issued by the International Searching Authority in International Application No. PCT/KR2020/019194.
(Continued)

*Primary Examiner* — Reza Aghevli
(74) *Attorney, Agent, or Firm* — Sughrue Mion, PLLC

(57) ABSTRACT

An electronic apparatus includes a stacked display including a plurality of panels, and a processor configured to obtain first light field (LF) images of different viewpoints, input the obtained first LF images to an artificial intelligence model for converting an LF image into a layer stack, to obtain a plurality of layer stacks to which a plurality of shifting parameters indicating depth information in the first LF images are respectively applied, and control the stacked display to sequentially and repeatedly display, on the stacked display, the obtained plurality of layer stacks. The artificial intelligence model is trained by applying the plurality of shifting parameters that are obtained based on the depth information in the first LF images.

25 Claims, 16 Drawing Sheets

(51) Int. Cl.
    *G06N 3/08*           (2006.01)
    *G09G 3/00*           (2006.01)
    *H04N 13/351*       (2018.01)
    *H04N 13/128*       (2018.01)

(52) U.S. Cl.
    CPC ......... *H04N 13/122* (2018.05); *H04N 13/128* (2018.05); *H04N 13/351* (2018.05)

(56) References Cited

U.S. PATENT DOCUMENTS

| | | | |
|---|---|---|---|
| 10,542,250 B2 * | 1/2020 | Kim | H04N 13/324 |
| 10,816,939 B1 * | 10/2020 | Coleman | G01S 17/86 |
| 11,044,398 B2 | 6/2021 | Molina et al. | |
| 11,094,075 B1 * | 8/2021 | Lanman | G06N 3/084 |
| 2013/0176704 A1 | 7/2013 | Lanman et al. | |
| 2015/0035880 A1 | 2/2015 | Heide et al. | |
| 2015/0172641 A1 * | 6/2015 | Nakamura | H04N 13/395 348/54 |
| 2016/0037153 A1 * | 2/2016 | Jeong | H04N 13/296 348/54 |
| 2017/0180700 A1 * | 6/2017 | Cho | H04N 13/111 |
| 2018/0184066 A1 * | 6/2018 | Salahieh | H04N 13/324 |
| 2019/0098290 A1 | 3/2019 | Baran et al. | |
| 2019/0158813 A1 | 5/2019 | Rowell et al. | |
| 2019/0166359 A1 * | 5/2019 | Lapstun | H04N 13/307 |
| 2020/0154099 A1 * | 5/2020 | Lapstun | H04N 13/383 |
| 2020/0363636 A1 * | 11/2020 | Karafin | G06F 3/016 |
| 2021/0112647 A1 * | 4/2021 | Coleman | H05B 47/11 |
| 2021/0136353 A1 * | 5/2021 | Kim | H04N 13/324 |
| 2021/0185303 A1 * | 6/2021 | Valli | H04N 13/398 |
| 2021/0337179 A1 * | 10/2021 | Wang | H04N 13/354 |

FOREIGN PATENT DOCUMENTS

| | | | | |
|---|---|---|---|---|
| CN | 109581731 | * | 4/2019 | ............. G02B 30/26 |
| CN | 111624784 A | * | 9/2020 | ......... G02B 27/0012 |
| JP | 2015-119203 A | | 6/2015 | |
| JP | 2019-80133 A | | 5/2019 | |
| KR | 10-2018-0071593 A | | 6/2018 | |
| KR | 20190091924 A | * | 8/2019 | |
| WO | 2019183211 A1 | | 9/2019 | |

OTHER PUBLICATIONS

Keita Takahashi et al., "From Focal Stack to Tensor Light-Field Display", IEEE Transactions on Image Processing, vol. 27, No. 9, Sep. 2018, pp. 4571-4584. (14 pages total).

Communication dated Sep. 9, 2022 issued by the European Patent Office in European Application No. 20908336.9.

Maruyama, K., et al., "A 3-D Display Pipeline from Coded-Aperture Camera to Tensor Light-Field Display through CNN", 2019 IEEE International Conference on Image Processing, Sep. 22, 2019, pp. 1064-1068, XP033647642.

Zhang, J., et al., "Unified Mathematical Model for Multilayer-Multiframe Compressive Light Field Displays Using LCDs", IEEE Transactions on Visualization and Computer Graphics, vol. 25, No. 3, Mar. 1, 2019, pp. 1603-1614, XP011706991.

Wetzstein, G., et al., "Tensor Displays: Compressive Light Field Synthesis using Multilayer Displays with Directional Backlighting", ACM Transactions on Graphics, pp. 1-11, Aug. 5, 2012, XP055145763.

Wang, S., et al., "Salience Guided Depth Calibration for Perceptually Optimized Compressive Light Field 3D Display", 2018 IEEE/CVF Conference on Computer Vision and Pattern Recognition, Jun. 18, 2018, pp. 2031-2040, XP033476168.

\* cited by examiner

ELECTRONIC APPARATUS AND CONTROL METHOD THEREOF

CROSS-REFERENCE TO RELATED APPLICATIONS

This application is based on and claims priority under 35 U.S.C. § 119 to Korean Patent Application Nos. 10-2019-0177062 and 10-2020-0133303, filed on Dec. 27, 2019, and Oct. 15, 2020, respectively, in the Korean Intellectual Property Office, the disclosures of which are incorporated by reference herein in their entireties.

BACKGROUND

1. Field

Apparatuses and methods consistent with the disclosure relate to an electronic apparatus and a control method thereof, and more particularly, to an electronic apparatus for obtaining an image for display on a stacked display apparatus, and a control method thereof.

2. Description of Related Art

With the development of electronic technology, various types of electronic apparatuses have been developed and popularized. A display apparatus such as a TV, which is one of the most widely used home appliances in general homes, has rapidly developed in recent years.

As the performance of the display apparatus has been advanced, types of contents displayed by the display apparatus have increased in various ways. Recently, a stereoscopic display system capable of viewing even three-dimensional (3D) content has been developed and popularized.

Stereoscopic display systems may be broadly classified into glasses-free systems that may be viewed without glasses, and glasses systems that must be viewed by wearing glasses.

Although the glasses system may provide a satisfactory stereoscopic effect, there is an inconvenience that viewers must use glasses. Because the glasses-free system has the advantage that 3D images may be viewed without glasses, discussions on the development of the glasses-free system are continuously conducted.

The glasses-free system of the related art has performed image rendering by using a plurality of light fields (LFs) images captured at different viewpoints or by a layer stack that is a stacked image including a plurality of layers obtained by factorizing the plurality of LF images. In the related art, image rendering has been performed by inputting a plurality of LF images to a non-negative tensor factorization (NTF) model or a non-negative metric factorization (NMF) model for performing factorization on the plurality of LF images, obtaining a layer stack including a plurality of layers, and simultaneously overlapping the plurality of layers on a stacked display including a plurality of panels.

However, the layer stack according to the related art has a limit to an expressible depth range. In addition, when the layer stack obtained according to the related art is displayed on the stacked display, there is a problem in that the image quality deteriorates compared with the LF image, and artifacts are generated.

SUMMARY

Provided are an electronic apparatus for performing image rendering by generating a layer stack reflecting depth information about an object included in a plurality of light field (LF) images, and a control method thereof.

Additional aspects will be set forth in part in the description that follows and, in part, will be apparent from the description, or may be learned by practice of the presented embodiments.

In accordance with an aspect of the disclosure, an electronic apparatus includes a stacked display including a plurality of panels, and a processor configured to obtain first light field (LF) images of different viewpoints, input the obtained first LF images to an artificial intelligence model for converting an LF image into a layer stack, to obtain a plurality of layer stacks to which a plurality of shifting parameters indicating depth information in the first LF images are respectively applied, and control the stacked display to sequentially and repeatedly display, on the stacked display, the obtained plurality of layer stacks. The artificial intelligence model is trained by applying the plurality of shifting parameters that are obtained based on the depth information in the first LF images.

The plurality of layer stacks may include a first layer stack to which a first shifting parameter indicating first depth information in the first LF images is applied, and a second layer stack to which a second shifting parameter indicating second depth information in the first LF images is applied. The first layer stack may be for displaying a region corresponding to the first depth information in the first LF images, and the second layer stack may be for displaying a region corresponding to the second depth information in the first LF images.

The plurality of layer stacks may further include a third layer stack, and the processor may be configured to sequentially and repeatedly display, on the stacked display, the first layer stack, the second layer stack, and the third layer stack.

The processor may be configured to reconstruct a second LF image, using the obtained plurality of layer stacks and the plurality of shifting parameters, compare the obtained first LF images and the reconstructed second LF image to obtain a loss function, and train the artificial intelligence model, based on the obtained loss function.

The processor may be configured to respectively apply the plurality of shifting parameters to the obtained plurality of layer stacks, to obtain a plurality of third LF images respectively with respect to the plurality of layer stacks, and reconstruct the second LF image based on the obtained plurality of third LF images.

The artificial intelligence model may be implemented as one among a deep neural network (DNN) model, a non-negative tensor factorization (NTF) model, and a non-negative metric factorization (NMF) model.

Based on the artificial intelligence model being the DNN model, a weight of the DNN model may be updated by the obtained loss function.

Based on the artificial intelligence model being one among the NTF model and the NMF model, a parameter of the artificial intelligence model may be updated by the obtained loss function.

The depth information may be obtained from the first LF images by a stereo matching technique, and the plurality of shifting parameters is obtained based on the obtained depth information.

A number of the plurality of shifting parameters may be the same as a number of the plurality of layer stacks.

In accordance with an aspect of the disclosure, a control method of an electronic apparatus includes obtaining first light field (LF) images of different viewpoints, inputting the obtained first LF images to an artificial intelligence model for converting an LF image into a layer stack, to obtain a plurality of layer stacks to which a plurality of shifting parameters indicating depth information in the first LF images are respectively applied, and sequentially and repeatedly displaying, on a stacked display, the obtained plurality of layer stacks. The artificial intelligence model is trained by applying the plurality of shifting parameters that are obtained based on the depth information in the first LF images.

The plurality of layer stacks may include a first layer stack to which a first shifting parameter indicating first depth information in the first LF images is applied, and a second layer stack to which a second shifting parameter indicating second depth information in the first LF images is applied, and the first layer stack may be for displaying a region corresponding to the first depth information in the first LF images, and the second layer stack may be for displaying a region corresponding to the second depth information in the first LF images.

The plurality of layer stacks may further include a third layer stack, and the displaying may include sequentially and repeatedly displaying, on the stacked display, the first layer stack, the second layer stack, and the third layer stack.

The control method may further include reconstructing a second LF image, using the obtained plurality of layer stacks and the plurality of shifting parameters, comparing the obtained first LF images and the reconstructed second LF image to obtain a loss function, and training the artificial intelligence model, based on the obtained loss function.

The reconstructing of the second LF image may further include respectively applying the plurality of shifting parameters to the obtained plurality of layer stacks, to obtain a plurality of third LF images respectively with respect to the plurality of layer stacks, and reconstructing the second LF image based on the obtained plurality of third LF images.

The artificial intelligence model may be implemented as one among a deep neural network (DNN) model, a non-negative tensor factorization (NTF) model, and a non-negative metric factorization (NMF) model.

Based on the artificial intelligence model being the DNN model, a weight of the DNN model may be updated by the loss function.

Based on the artificial intelligence model being one among the NTF model and the NMF model, a parameter of the artificial intelligence model may be updated by the obtained loss function.

The depth information may be obtained from the first LF images by a stereo matching technique, and the plurality of shifting parameters may be obtained based on the obtained depth information.

A number of the plurality of shifting parameters may be the same as a number of the plurality of layer stacks.

A non-transitory computer-readable storage medium may store instructions, when executed by a processor, cause the processor to perform the control method.

In accordance with an aspect of the disclosure, a method of training an artificial intelligence model for performing a trained factorization, includes obtaining a first LF image, obtaining a plurality of shifting parameters, based on depth information about at least one object included in the obtained first LF image, inputting the obtained first LF image to the artificial intelligence model to obtain a plurality of layer stacks, reconstructing a second LF image, using the obtained plurality of layer stacks and the obtained plurality of shifting parameters, training the artificial intelligence model, based on the obtained first LF image and the reconstructed second LF image, inputting the obtained first LF image to the trained artificial intelligence model to obtain the plurality of layer stacks, and repeatedly reproducing and performing image rendering on the plurality of layer stacks obtained through the trained artificial intelligence model.

The method may further include obtaining the depth information about the at least one object included in the obtained first LF image, through a stereo matching technique.

The training may include comparing the reconstructed second LF image with the obtained first LF image to obtain a loss function, obtaining information about an image quality of the second LF image, based on the obtained loss function, and training the artificial intelligence model based on the obtained information about the image quality.

A non-transitory computer-readable storage medium may store instructions, when executed by a processor, cause the processor to perform the method.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Hereinafter, various embodiments will be described in detail with reference to the accompanying drawings.

Figure 1A:
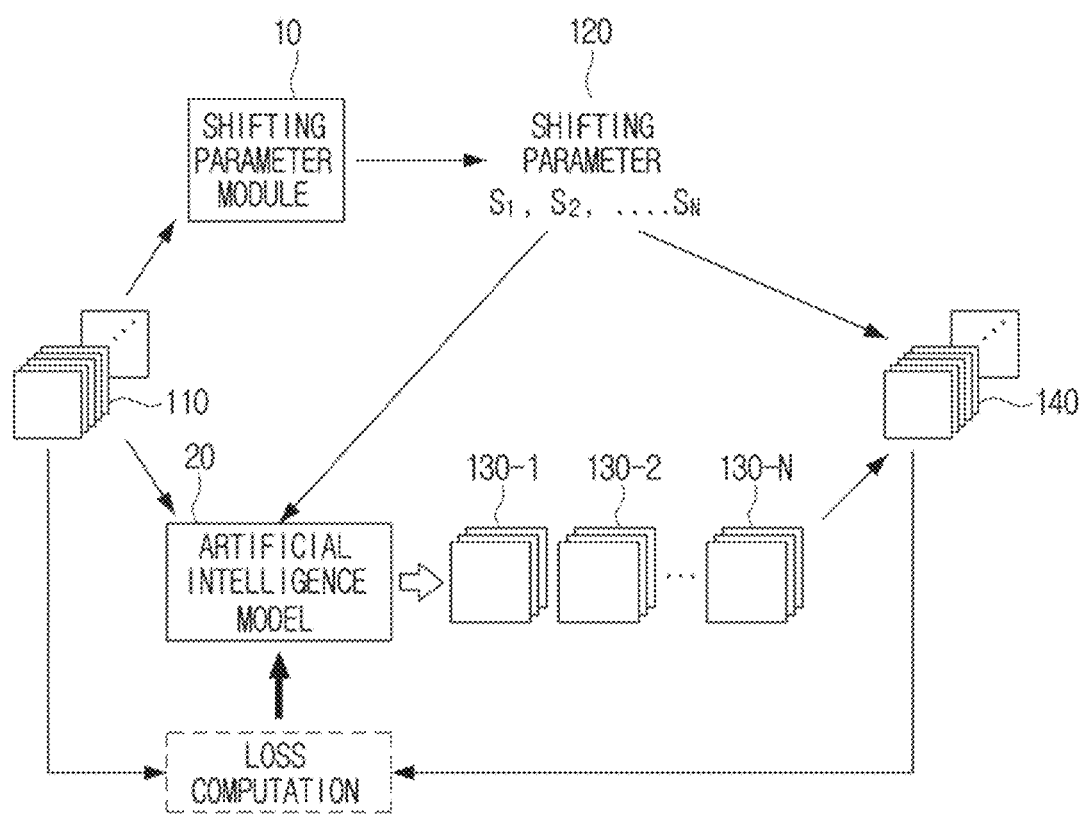
FIG. 1A is a diagram illustrating an operation of an electronic apparatus according to an embodiment.

FIG. 1A is a diagram illustrating an operation of an electronic apparatus according to an embodiment.

The electronic apparatus according to the disclosure may obtain first light field (LF) images 110 of different viewpoints. The LF image is an image captured by an LF camera. The LF camera may capture at least one object at different viewpoints. That is, a plurality of image sets in which at least one object is captured at a plurality of viewpoints by the LF camera may be LF images. Accordingly, the first LF images 110 according to the disclosure may be a plurality of image sets obtained by capturing at least one object by the LF camera.

In addition, the electronic apparatus according to an embodiment may obtain a plurality of shifting parameters 120 from the first LF images 110 by a shifting parameter module 10. The shifting parameter module 10 is a configuration for obtaining depth information about an LF image and obtaining a plurality of shifting parameters corresponding to the depth information. That is, the plurality of shifting parameters 120 indicate representative depth information values included in the LF image and may be obtained based on the depth information according to the disclosure.

As an embodiment, the depth information may be information indicating distance information between at least one object included in the LF image. A difference in depth between at least one object included in the plurality of first LF images 110 may be identified based on the shifting parameters obtained by the shifting parameter module 10. For example, among at least one object included in the plurality of first LF images 110, a reference object in which the size of a shifting parameter is 0 may be set. When the size of a first shifting parameter S1 among the plurality of shifting parameters is larger than the size of a second shifting parameter S2, among at least one object included in the plurality of first LF images 110, an object corresponding to the second shifting parameter S2 may be relatively closer to the reference object than an object corresponding to the first shifting parameter S1.

In addition, the shifting parameter 120 may be obtained as many as the number corresponding to a plurality of layer stacks 130-1, 130-2, . . . , 130-N according to the disclosure. As an embodiment, when the number of objects included in the first LF image 110 is N, the number of the plurality of layer stacks may also be N. However, the disclosure is not limited thereto, and the number of objects included in the plurality of first LF images 110 may be determined according to the number of the plurality of layer stacks. That is, the number of objects included in the plurality of first LF images 110 according to the disclosure is not limited to the number of real objects included in the plurality of first LF images 110, and the number of objects may be more or less than the number of real objects included in the plurality of first LF images 110 according to the number of the plurality of first LF images 110. For example, referring to FIG. 9A, two shifting parameters shift1 and shift2 may be obtained from one dinosaur object. Details of the object and shifting parameters included in the first LF images 110 will be described later with reference to FIG. 9A.

Referring to FIG. 1A, when the number of the plurality of layer stacks 130-1, 130-2, . . . , 130-N obtained by an artificial intelligence model 20 for performing factorization is N, the electronic apparatus may obtain the N shifting parameters 120 from the plurality of first LF images 110 by the shifting parameter module 10. The shifting parameter module 10 will be described in detail with reference to FIG. 3.

In addition, the electronic apparatus may input the plurality of first LF images 110 and the plurality of shifting parameters 120 to the artificial intelligence model 20 for converting the LF image into a layer stack and obtain the plurality of layer stacks 130-1, 130-2, . . . , 130-N. The artificial intelligence model 20 is a factorization model for converting a plurality of LF images into a plurality of layer stacks. The artificial intelligence model 20 according to the disclosure may be a deep neural network (DNN) model, a non-negative tensor factorization (NTF) model or a non-negative metric factorization (NMF) model. In addition, the artificial intelligence model 20 of FIG. 1A may be a model that is not completely trained, and the performance thereof may be improved by a training process.

According to an embodiment, the plurality of layer stacks 130-1, 130-2, . . . , 130-N may include the first layer stack 130-1 to the Nth layer stack 130-N. According to the disclosure, each of the plurality of layer stacks 130-1, 130-2, . . . , 130-N may be a layer stack for clearly expressing an object corresponding to a shifting parameter applied to each of the plurality of layer stacks 130-1, 130-2, . . . , 130-N among at least one object included in the first LF image. That is, each of the plurality of layer stacks 130-1, 130-2, . . . , 130-N may be a layer stack for improving expression quality of resolution or expression quality of the viewing angle of an object corresponding to a shifting parameter applied to each of the plurality of layer stacks 130-1, 130-2, . . . , 130-N among at least one object included in the first LF image.

For example, the first layer stack 130-1 may be a layer stack for clearly expressing a first object among objects included in a plurality of first LF images by applying the first shifting parameter S1. That is, the first shifting parameter S1 may be a parameter indicating first depth information about the first object, and the first layer stack 130-1 may be a layer stack for clearly displaying a region corresponding to the first depth information in the first LF images. That is the first layer stack 130-1 may be a layer stack for improving expression quality of resolution of an displaying a region corresponding to the first depth information in the first LF images or improving expression quality of the viewing angle of an displaying a region corresponding to the first depth information in the first LF images.

In addition, the second layer stack 130-2 may be a layer stack for clearly expressing a second object among at least one object included in the plurality of first LF images by applying the second shifting parameter S2. That is, the second shifting parameter S2 may be a parameter indicating second depth information about the second object, and the second layer stack 130-2 may be a layer stack for clearly displaying a region corresponding to the second depth information in the first LF images. That is the second layer stack 130-2 may be a layer stack for improving expression quality of resolution of an displaying a region corresponding to the second depth information in the first LF images or improving expression quality of the viewing angle of an displaying a region corresponding to the second depth information in the first LF images.

In addition, each of the plurality of layer stacks 130-1, 130-2, . . . , 130-N according to an embodiment may include a plurality of layers. For example, if a stacked display apparatus for displaying the plurality of layer stacks 130-1, 130-2, . . . , 130-N have three panels, the first layer stack 130-1 may include three layer images. Each of the second layer stack 130-2, the third layer stack 130-3, and the N-th layer stack 130-N may also include three layer images. That is the third layer stack 130-3 may be a layer stack for improving expression quality of resolution of an displaying a region corresponding to third depth information in the first LF images or improving expression quality of the viewing angle of an displaying a region corresponding to third depth information in the first LF images.

In FIG. 1A, each of the plurality of layer stacks 130-1, 130-2, ..., 130-N includes three layers (for example, referring to FIG. 1A, the first layer stack 130-1 includes three layers), the disclosure is not limited thereto. According to the hardware performance of the electronic apparatus for rendering a plurality of layer stacks by a time multiplexing technique or the number of panels of a stacked display for displaying the plurality of layer stacks, the number of layers in each of the plurality of layer stacks 130-1, 130-2, ..., 130-N) may change.

According to an embodiment, the electronic apparatus may reconstruct the plurality of layer stacks 130-1, 130-2, ..., 130-N obtained by the artificial intelligence model 20 in the form of an LF image and obtain a second LF image 140. Further, the electronic apparatus may compare the second LF image 140 and the first LF image 110 and train the artificial intelligence model 20.

Referring to FIG. 1A, the electronic apparatus may reconstruct the second LF image 140 using the plurality of layer stacks 130-1, 130-2, ..., 130-N and the plurality of shifting parameters 120.

The second LF image 140 is an image obtained by reconstructing a layer stack in the form of an LF image to train the artificial intelligence model 20. The electronic apparatus may input the plurality of shifting parameters 120 and the plurality of first LF images 110 to the artificial intelligence model 20, and obtain the plurality of first layer stacks 130-1, 130-2, ..., 130-N in which the plurality of shifting parameters 120 are respectively reflected according to the current performance of the artificial intelligence model 20. In addition, to obtain information about the quality of an image with respect to the plurality of layer stacks 130-1, 130-2, ..., 130-N, the electronic apparatus may perform shifting on each of the plurality of layer stacks 130-1, 130-2, ..., 130-N for each view according to the plurality of shifting parameters and obtain the second LF image 140. According to an embodiment, the first LF images 110 is a plurality of images captured by the LF camera, and the second LF image 140 is an image obtained by reconstructing a plurality of layer stacks in the form of an LF image based on the plurality of layer stacks and the plurality of shifting parameters.

Further, the electronic apparatus may compare the obtained plurality of second LF images 140 with the plurality of first LF images 110, obtain information about the quality of the plurality of second LF images 140, and train the artificial intelligence model 20 based on the information about the quality of the obtained image. According to an embodiment, the information about the quality of the plurality of second LF images 140 may be obtained by a loss function. The loss function is an index indicating the current learning state of the artificial intelligence model 20. A model for performing factorization may be trained based on the loss function. A method of training the artificial intelligence model 20 and the loss function based on the first LF image 110 and the second LF image 140 will be described in detail with reference to FIG. 4.

Figure 1B:
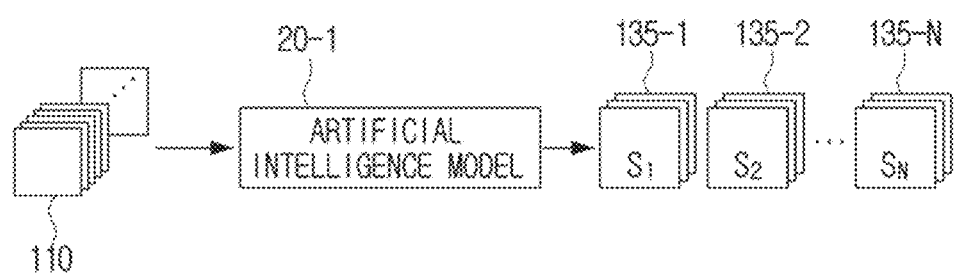
FIG. 1B is a diagram illustrating a method of obtaining a plurality of layer stacks through a trained artificial intelligence model according to an embodiment.

When training of the artificial intelligence model 20 is completed according to FIG. 1A, a plurality of layer stacks 135-1, 135-2, ..., 135-N may be obtained through a trained artificial intelligence model 20-1 as shown in FIG. 1B. FIG. 1B is a diagram illustrating a method of obtaining a plurality of layer stacks through the trained artificial intelligence model 20-1 according to an embodiment.

That is, the plurality of layer stacks 135-1, 135-2, ..., and 135-N obtained through the trained artificial intelligence model 20-1 of FIG. 1B, which are the plurality of layer stacks 135-1, 135-2, ..., and 135-N obtained through the trained artificial intelligence model 20-1 of which performance is more improved than that of the artificial intelligence model 20 of FIG. 1A, may be layer stacks in which shifting parameters are well reflected compared to the plurality of layer stacks 130-1, 130-2, ..., 130-N of FIG. 1A. That is, the plurality of layer stacks 135-1, 135-2, ..., and 135-N of FIG. 1B may be layer stacks from which artifacts are removed and a peak to noise ratio (PSNR) is improved compared to the plurality of layer stacks 135-1, 135-2, ..., and 135-N.

In addition, the electronic apparatus may perform image rendering by a time multiplexing technique of sequentially and repeatedly displaying the plurality of layer stacks 135-1 to 135-N obtained through the trained artificial intelligence model 20-1 on a stacked display.

Figure 1C:
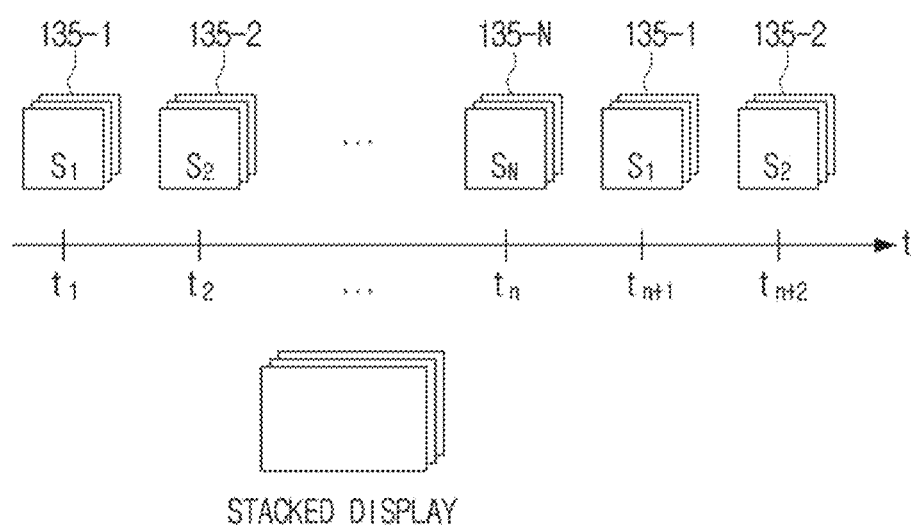
FIG. 1C is a diagram illustrating a time multiplexing technique according to an embodiment.

FIG. 1C is a diagram illustrating a time multiplexing technique according to an embodiment. Referring to FIG. 1C, an electronic apparatus may sequentially display the plurality of layer stacks 135-1 to 135-N obtained through the trained artificial intelligence model 20-1 on a stacked display through the time multiplexing technique. The stacked display that is a display for providing a 3D stereoscopic image may include a plurality of panels, and display images simultaneously on the plurality of panels to provide a stereoscopic image. That is, among the plurality of layer stacks 135-1, 135-2, ..., and 135-N obtained through the trained artificial intelligence model 20-1 of FIG. 1B according to the disclosure, three images in the first layer stack 135-1 may be simultaneously displayed on the respective panels of a stacked display apparatus to provide the stereoscopic image.

According to the disclosure, the time multiplexing technique is a technique of rendering and displaying in order the first layer stack 135-1 and the second layer stack 130-2 to the N-th layer stack 135-N obtained through the trained artificial intelligence model 20-1.

That is, referring to FIG. 1C, the electronic apparatus may display the first layer stack 135-1 obtained through the trained artificial intelligence model 20-1 on the stacked display at time t1. That is, the three images included in the first layer stack 135-1 may be respectively displayed on the three panels of the stacked display at the time t1. In addition, the electronic apparatus may display the second layer stack 135-2 on the stacked display at time t2. Here, the time interval between t1 and t2 may be a short time interval (e.g., 0.01 second). Also, the time interval between t1 and t2 may change according to a scanning rate of the stacked display.

The electronic apparatus may repeat this process to display the N-th layer stack 135-N on the stacked display at time tn. In addition, the electronic apparatus may display the first layer stack 135-1 on the stacked display again at time tn+1. That is, the electronic apparatus may display a plurality of layer stacks on the stacked display through the time multiplexing technique of repeatedly reproducing the plurality of layer stacks 135-1 to 135-N obtained through the trained artificial intelligence model 20-1 at high speed, and thus a range of depth expressible in the stacked display apparatus may increase.

The electronic apparatus may obtain the plurality of layer stacks 135-1 to 135-N to which shifting parameter are applied respectively by the trained artificial intelligence model 20-1 through the above-described processes. In other words, by generating the plurality of layer stacks reflecting depth information of at least one object included in a plurality of LF images, there is no limit to the expressible depth range, and artifacts that may occur in image rendering on the layer stack may be removed.

In addition, the electronic apparatus may repeatedly reproduce the plurality of layer stacks to which the shifting parameters are applied respectively at high speed to perform image rendering, thereby obtaining a rendering image having an improved PSNR.

Figure 2:
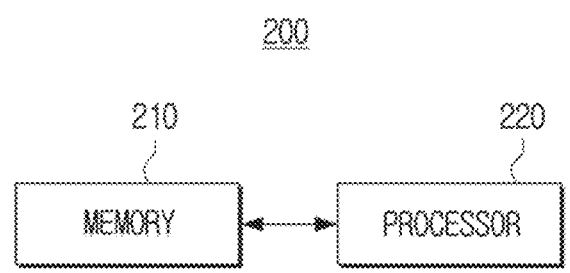
FIG. 2 is a block diagram illustrating a configuration of an electronic apparatus according to an embodiment.

FIG. 2 is a block diagram illustrating a configuration of an electronic apparatus according to an embodiment.

Referring to FIG. 2, an electronic apparatus 200 may include a memory 210 and a processor 220. The electronic apparatus 200 according to the disclosure may be a stacked display apparatus including a plurality of panels. As an embodiment, when the electronic apparatus 200 is the stacked display apparatus including three panels, the electronic apparatus 200 may provide an image through a layer stack including three images as shown in FIG. 1C.

The memory 210 may store various programs and data for an operation of the electronic apparatus 200. At least one instruction may be stored in the memory 210. The processor 220 may perform the operation of the electronic apparatus 200 by executing the instruction stored in the memory 210.

The memory 210 may store instructions or data related to at least one other element of the electronic apparatus 200. The memory 210 may be implemented as a non-volatile memory, a volatile memory, a flash-memory, a hard disk drive (HDD), a solid state drive (SSD), or the like. The memory 210 may be accessed by the processor 220, and data read/write/edit/delete/update may be performed by the processor 220. In the disclosure, the term memory may include the memory 210, a ROM and a RAM in the processor 220, or a memory card (e.g., a micro SD card and a memory stick) mounted in the electronic apparatus 200.

Functions related to artificial intelligence according to the disclosure operate through the processor 220 and the memory 210.

The processor 220 may be configured as one or a plurality of processors. In this case, one or more processors may be a general-purpose processor such as a central processing unit (CPU), an application processor (AP), a graphics dedicated processor such as a graphics processing unit (GPU), a visual processing unit (VPU) or an artificial intelligence dedicated processor such as a neural processing unit (NPU).

One or more processors control to process input data according to a predefined operation rule or an artificial intelligence model stored in the memory. The predefined motion rule or the artificial intelligence model is configured by training. Here, configuring by training means that a predefined operation rule or an artificial intelligence model of a desired feature is configured by applying a training algorithm to a plurality of training data. Such training may be performed in a device on which artificial intelligence according to the disclosure is performed, or through a separate server/system.

The artificial intelligence model may include a plurality of neural network layers. Each layer includes a plurality of weight values, and performs a layer operation through an operation result of a previous layer and an operation of the plurality of weight values. Examples of a neural network include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), and deep Q-Networks. The neural network in the disclosure is not limited to the above-described examples except for the case in which specified.

The processor 220 is electrically connected to the memory 210 to control overall operations and functions of the electronic apparatus 200. The processor 220 may execute at least one instruction stored in the memory 210 to obtain a first LF image by capturing at least one object at a different viewpoint. The first LF image according to the disclosure may be a plurality of images obtained by capturing at least one object by using an LF camera.

Further, the processor 220 may obtain a plurality of shifting parameters based on depth information of at least one object included in the first LF image through the shifting parameter module 10. That is, the shifting parameter module 10 is a configuration for obtaining depth information from an LF image and obtaining a plurality of shifting parameters based on the depth information.

The plurality of shifting parameters are parameters for indicating distance information between at least one object included in a plurality of first LF images according to the disclosure. The shifting parameter module 10 may obtain the depth information about at least one object included in the plurality of first LF images through a stereo matching technique. As an embodiment, the depth information may be in the form of a depth map. The depth map means a table including depth information for each area of an image. The shifting parameter module 10 may obtain a plurality of shifting parameters based on the obtained depth information. The shifting parameter module 10 may obtain a depth map based on the depth information about at least one object included in the plurality of first LF images, extract representative disparity information from the depth map, and obtain the number of shifting parameters corresponding to the number of first layer stacks. A method of obtaining the depth information and the shifting parameters through the stereo matching technique will be described in detail with reference to FIG. 3.

Further, the processor 220 may input the first LF image to the artificial intelligence model 20 to obtain a plurality of layer stacks. The artificial intelligence model 20 is a model for converting an LF image into the plurality of layer stacks. That is, factorization is performed through the artificial intelligence model 20 such that the LF image may be converted into a layer stack for display on a stacked display. The artificial intelligence model 20 according to the disclosure is an artificial intelligence model that is not completely trained. The processor 220 may train the artificial intelligence model 20 based on the plurality of layer stacks obtained from the artificial intelligence model 20. The processor 220 may obtain the plurality of layer stacks through the artificial intelligence model 20 that is not completely trained, and reconstruct a plurality of second LF images using the obtained plurality of layer stacks and the plurality of shifting parameters. The plurality of second LF images are a plurality of LF images for training the artificial intelligence model 20. A method of reconstructing the plurality of second LF images will be described in detail with reference to FIG. 4.

In addition, the processor 220 may train the artificial intelligence model 20 based on the plurality of first LF images and the plurality of second LF images. In addition, the processor 220 may input the plurality of first LF images to the trained artificial intelligence model 20-1, and obtain the plurality of layer stacks in which depth information about at least one object included in the plurality of LF images is reflected. In addition, the processor 220 may perform image rendering through a time multiplexing technique of repeatedly reproducing the plurality of layer stacks obtained through the artificial intelligence model 20-1 that is completely trained at high speed.

According to an embodiment, the artificial intelligence model 20 may be implemented as a deep neural network (DNN) model, a non-negative tensor factorization (NTF) model, or a non-negative metric factorization (NMF) model.

When the artificial intelligence model 20 is the DNN model, the processor 220 may input the first LF image to the DNN model that is not trained to obtain the plurality of layer stacks and reconstruct the plurality of layer stacks as a second LF image. Further, the processor 220 may compare the plurality of first LF images and the plurality of second LF images to obtain a loss function. The loss function is an index indicating the current training state of an artificial intelligence model. Based on the loss function, a model for performing factorization may be trained. The loss function is an index indicating the poor performance of the artificial intelligence model, and the artificial intelligence model may be trained in a direction in which the loss function decreases. Details of the loss function will be described with reference to FIG. 4.

Further, the processor 220 may update the weight of the DNN model based on the obtained loss function. In addition, the processor 220 may input the first LF image to the DNN model that is completely trained and obtain a second layer stack for display on the stacked display apparatus.

When the artificial intelligence model 20 is one of a non-negative tensor factorization (NTF) model and a non-negative metric factorization (NMF), the processor 220 may input the first LF image to one of the NTF model and the NMF model that are not trained and obtain the plurality of layer stacks. When the artificial intelligence model 20 is one of the NTF model and the NMF model, the processor 220 may compare the first LF image and the second LF image and obtain the loss function. In addition, the processor 220 may update parameters of a model in which the plurality of first LF images are input among the NTF model and the NMF model based on the obtained loss function.

In addition, the processor 220 may input the first LF image to one of the NTF model and the NMF model that are completely trained and obtain the plurality of layer stacks for display on the stacked display.

As an embodiment, the electronic apparatus 200 may further include a stacked display. As an example, the stacked display may include a plurality of display panels. The plurality of display panels may be implemented as liquid crystal display (LCD) panels, and in this case, the stacked display may further include a backlight. The backlight is a configuration for irradiating light onto a display panel. That is, a backlight unit is a configuration for irradiating light onto the plurality of display panels.

As an embodiment, when the stacked display includes the backlight unit and includes a first display panel, a second display panel, and a third display panel, the first display panel may be stacked on the backlight unit. In addition, the second display panel may be stacked on the first display panel, and the third display panel may be stacked on the second display panel.

The backlight may include a light guide plate, an optical sheet, and a light source. The light source may be implemented as a light emitting diode (LED) or a cold cathode fluorescent lamp (CCFL). In addition, the backlight may be implemented as an edge-lit type in which the light source is disposed on the side of the light guide plate to indirectly irradiate light onto the display panel, or a direct-lit type in which the light source is disposed on the back of the display panel.

As another embodiment, the plurality of display panels may be implemented as organic light emitting diode (OLED) panels. When the plurality of display panels are implemented as OLED panels, the stacked display may not include a backlight. That is, light may be irradiated from each of the OLED panels itself without a backlight.

Figure 3:
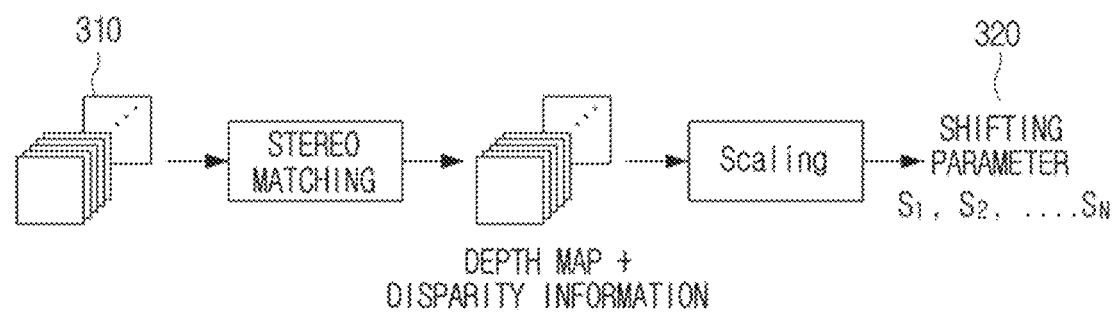
FIG. 3 is a diagram illustrating a method of obtaining a shifting parameter according to an embodiment.

FIG. 3 is a diagram illustrating a method of obtaining a shifting parameter according to an embodiment.

Referring to FIG. 3, the electronic apparatus 200 may obtain a first plurality of shifting parameters 320 from a first LF image 310 through the shifting parameter module 10. First, the electronic apparatus 200 may obtain the first LF image 310. The first LF image 310 may be a plurality of LF images obtained by capturing at least one object at different viewpoints.

In addition, the electronic apparatus 200 may obtain depth information about the at least one object in the first LF image 310 through the shifting parameter module 10. According to an embodiment, the electronic apparatus 200 may obtain the depth information about the at least one object included in the first LF image 310 by using a stereo matching technique through the shifting parameter module 10. The stereo matching technique is a technique of calculating a distance between at least one object included in a plurality of images based on the plurality of images obtained by capturing at least one object at different viewpoints. The stereo matching technique is a technique of setting one reference image among the plurality of images obtained by capturing at least one object at different viewpoints, searching for the same region corresponding to one region in the reference image from a plurality of other images, and obtaining depth information included in an image. That is, disparity information of the plurality of images obtained by capturing at least one object at different viewpoints may be obtained through the stereo matching technique. The stereo matching technique may be used to obtain 3D depth information of a plurality of images based on the plurality of images that are two-dimensionally captured.

As an embodiment, the electronic apparatus 200 may obtain a depth map for each region of the first LF image 310 using the stereo matching technique through the shifting parameter module 10. The depth map means a table including depth information for each region of an image. The electronic apparatus 200 may set one LF image among the first LF images 310 as a reference image using the stereo matching technique through the shifting parameter module 10, and obtain a depth map 315 including disparity information indicating a location difference between one region of the reference image and a part of the other images corresponding to one region of the reference image.

Further, the electronic apparatus 200 may obtain the plurality of shifting parameters 320 through the shifting parameter module 10 based on the obtained depth map. That is, the electronic apparatus may obtain the plurality of shifting parameters 320 by extracting representative disparity information from the obtained depth map by a number corresponding to the number of a plurality of first layer stacks, or may obtain a value obtained by scaling the disparity information extracted from the depth map as the shifting parameter 320. According to the disclosure, the value of the shifting parameter 320 may be an integer or a real number.

Through the above-described process, depth information about at least one object included in the first LF image may be obtained, and shifting parameters corresponding to a plurality of first layer stacks may be obtained based on the depth information.

Figure 4:
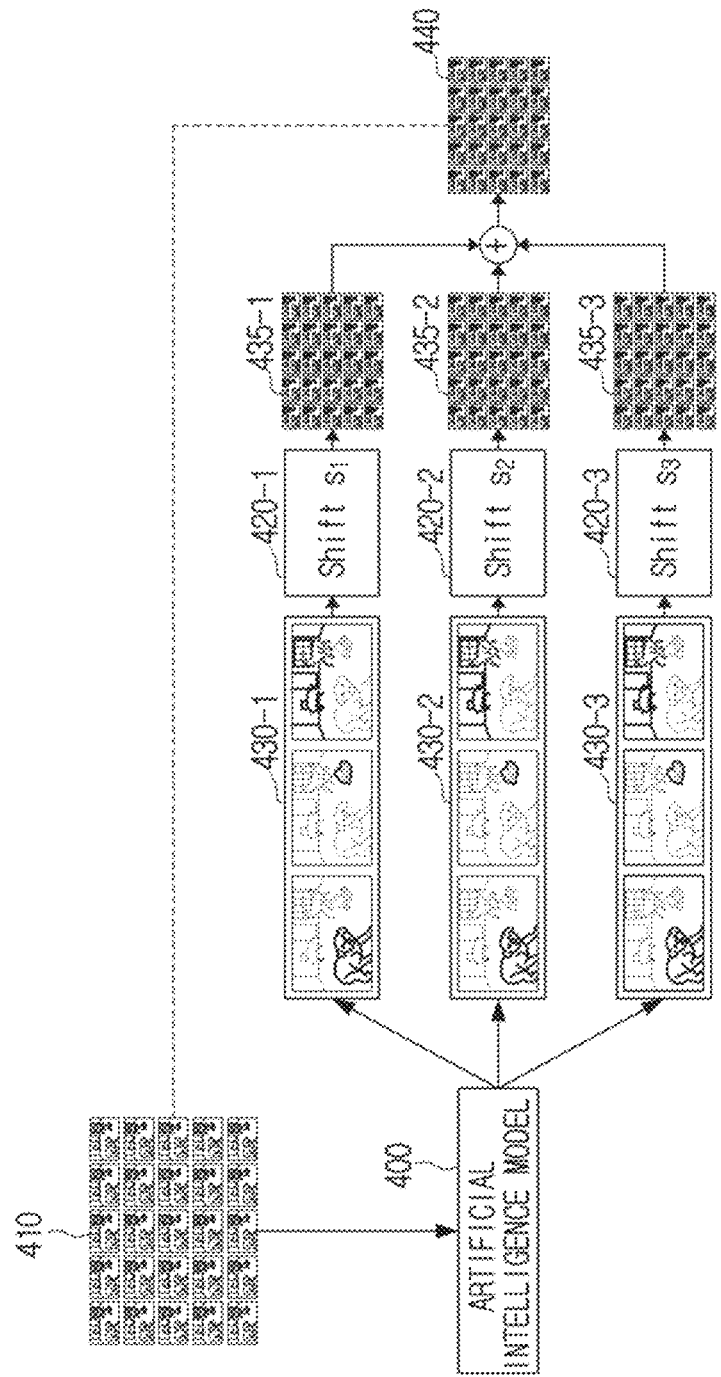
FIG. 4 is a diagram illustrating an operation of an electronic apparatus for training an artificial intelligence model for performing factorization according to an embodiment.

FIG. 4 is a diagram illustrating an operation of an electronic apparatus for training an artificial intelligence model for performing factorization according to an embodiment.

Referring to FIG. 4, first, the electronic apparatus 200 may obtain a first LF image 410. In addition, the electronic apparatus 200 may input the first LF image 410 to an artificial intelligence model 400 for performing factorization, and obtain a plurality of layer stacks 430-1, 430-2, and 430-3. The artificial intelligence model 400 is a model for converting a plurality of LF images into a plurality of layer stacks. According to the disclosure, the electronic apparatus 200 may perform image rendering through a time multiplexing technique of repeatedly reproducing the plurality of layer stacks obtained though the artificial intelligence model 400 at high speed. According to an embodiment, the artificial intelligence model 400 may be a deep neural network (DNN) model, a non-negative tensor factorization (NTF) model, or a non-negative metric factorization (NMF) model.

Referring to FIG. 4, the plurality of layer stacks may include the first layer stack 430-1, the second layer stack 430-2, and the third layer stack 430-3. In FIG. 4, the plurality of first layer stacks includes three layer stacks, but the disclosure is not limited thereto. The number of the plurality of first layer stacks may change according to the performance of hardware of an electronic apparatus for rendering the plurality of layer stacks through a time multiplexing technique.

Each of the first layer stack 430-1, the second layer stack 430-2, and the third layer stack 430-3 may include three layer images. That is, the first layer stack 430-1 to the third layer stack 430-3 may include three layer images for display respectively on stacked display apparatuses including three panels.

In addition, the electronic apparatus may obtain three shifting parameters s1, s2, and s3 420-1, 420-2, and 420-3 from the first LF image 410 by the method described in FIG. 3, apply the shifting parameters s1, s2, and s3 420-1, 420-2, and 420-3 to the plurality of layer stacks 430-1, 430-2, and 430-3 respectively, and reconstruct a plurality of third LF images 435-1, 435-2, and 435-3 to the plurality of layer stacks 430-1, 430-2, and 430-3 respectively. The plurality of third LF images 435-1, 435-2, and 435-3 are images in which the plurality of layer stacks 430-1, 430-2, and 430-3 are reconstructed in the form of a plurality of LF images.

The plurality of third LF images 435-1, 435-2, and 435-3 may include the plurality of 3-1th LF images 435-1, the plurality of 3-2th LF images 435-2, and the plurality of 3-3th LF images 435-3.

The plurality of 3-1th LF images 435-1 are images in which the shifting parameter s1 is applied to the first layer stack 430-1 such that the first layer stack 430-1 is reconstructed in the form of a plurality of LF images, the plurality of 3-2th LF images 435-2 are images in which the shifting parameter s2 is applied to the second layer stack 430-2 such that the second layer stack 430-2 is reconstructed in the form of a plurality of LF images, and the plurality of 3-3th LF images 435-3 are images in which the shifting parameter s3 is applied to the third layer stack 430-3 such that the third layer stack 430-3 is reconstructed in the form of a plurality of LF images. A detailed method of reconstructing an LF image by applying a plurality of shifting parameters to a plurality of layer stacks respectively will be described in detail with reference to FIGS. 6A and 6B.

Further, the electronic apparatus may obtain a plurality of second LF images 440 based on the reconstructed plurality of third LF images 435-1, 435-2, and 435-3. The plurality of second LF images 440 may be a plurality of LF images reconstructed based on an average value of the plurality of 3-1th LF images 435-1, the plurality of 3-2th LF images 435-2, and the plurality of 3-3th LF images 435-3. The plurality of second LF images 440 may be images obtained by averaging and adding pixel values included in the plurality of 3-1th LF images 435-1, the plurality of 3-2th LF images 435-2, and the plurality of 3-3th LF images 435-3.

The electronic apparatus may train the artificial intelligence model 400 based on the reconstructed plurality of second LF images 440 and first LF images 410.

According to an embodiment, the electronic apparatus may compare the reconstructed plurality of second LF images 440 and first LF images 410, obtain a loss function, and train the artificial intelligence model 400 based on the obtained loss function.

When the artificial intelligence model 400 is a DNN model, the electronic apparatus may update a weight of the DNN model based on the loss function. In addition, when the artificial intelligence model 400 for performing factorization is a non-negative tensor factorization (NTF) model or a non-negative metric factorization (NMF) model, the electronic apparatus may update a parameter of the NTF model or the NMF model based on the loss function.

A method of obtaining the loss function according to the disclosure includes a mean squared error method of calculating the loss function using an error of a mean square, a structural similarity index (SSIM) method of calculating the loss function by measuring image quality, an L1 norm method of calculating the loss function using least absolute deviations or least absolute errors, and an L2 norm method of calculating the loss function using least squares errors. However, the disclosure is not limited thereto, and the loss function may be obtained using a combination of the above-described methods or other methods.

In addition, the electronic apparatus may train the artificial intelligence model 400 in a direction of reducing the obtained loss function.

Through the above-described process, when the artificial intelligence model 400 for performing factorization is trained, and the first LF image is input to the trained artificial intelligence model, a plurality of second layer stacks in which a plurality of shifting parameters are reflected may be obtained.

Figure 5:
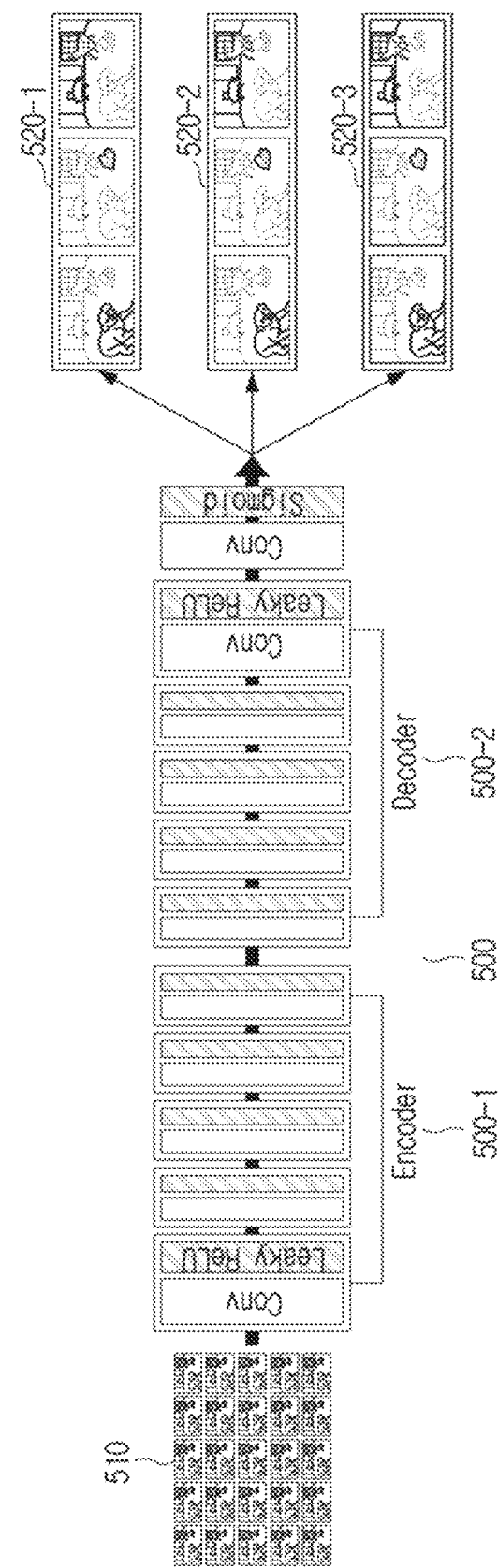
FIG. 5 is a diagram illustrating an artificial intelligence model for performing factorization according to an embodiment.

FIG. 5 is a diagram illustrating a case in which an artificial intelligence model for performing factorization is a DNN model according to an embodiment.

Referring to FIG. 5, the artificial intelligence model for performing factorization according to an embodiment may be a DNN model 500 including an encoder and a decoder. According to an embodiment, a first LF image 510 may be input to an encoder 500-1 of the DNN model 500, and a decoder 500-2 may output a plurality of first layer stacks 520-1, 520-2 and 520-3 with respect to the first LF image 510. In addition, each of the encoder 500-1 and the decoder 500-2 may include a convolutional layer. The convolutional layer is a layer processing a convolution operation on data input to the convolutional layer, and may be mainly used to process data having a shape such as a video or an image.

The electronic apparatus may input the first LF image to the DNN model 500 for performing factorization and obtain a plurality of first layer stacks 520-1, 520-2, and 520-3 with respect to the first LF image. Further, the electronic apparatus may update a weight of the DNN model 500 for performing factorization and train the DNN model 500 for performing factorization, based on the loss function described above in FIG. 4.

Figure 6A:
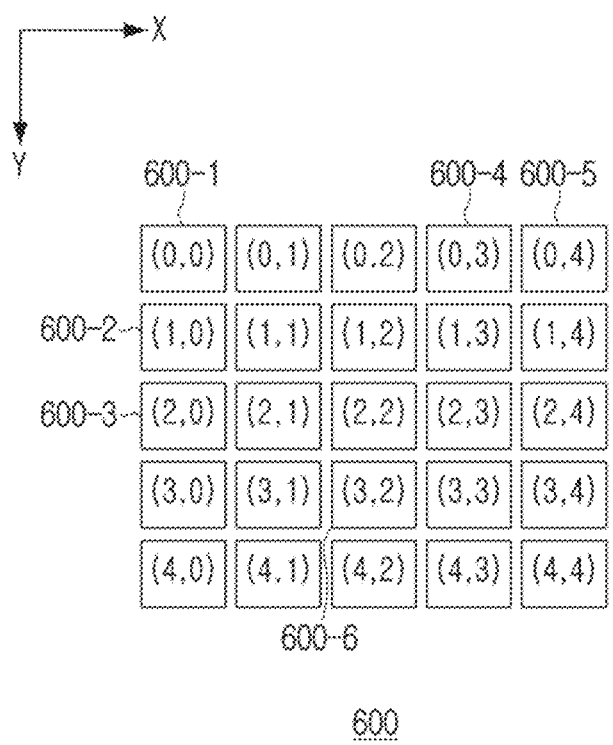
FIG. 6A is a diagram illustrating a light field (LF) image set configured in 5×5.

FIG. 6A is a diagram illustrating an LF image set configured in 5×5. The LF image 600 of FIG. 6A may be a (second) LF image 600 reconstructed using any one layer stack of a plurality of layer stacks and a shifting parameter Sn corresponding to the layer stack according to an embodiment. That is, the second LF image 600 according to the disclosure may be captured at 25 views as shown in FIG. 6A and include a plurality of reconstructed images.

Figure 6B:
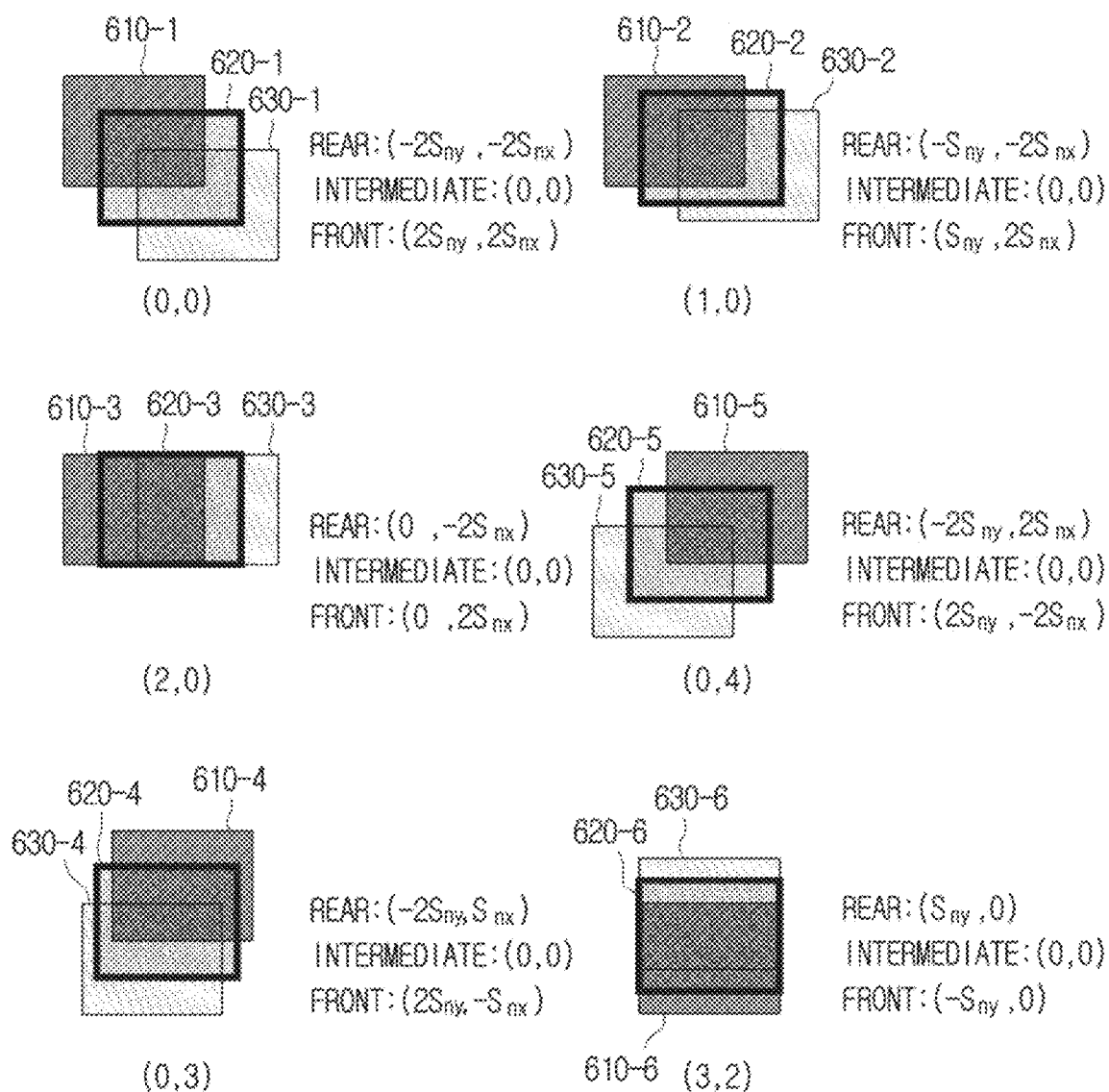
FIG. 6B is a diagram illustrating a method of reconstructing an LF image by shifting three images in a layer stack according to a view corresponding to each LF image.

As an embodiment, one layer stack may include three layer images 610, 620, and 630 as shown in FIG. 6B, and the LF image 600 may be reconstructed by differently applying the shifting parameter Sn to the three layer images 610, 620, and 630 for each view. That is, according to the disclosure, the second LF image 600 may be obtained by applying a disparity between different views for each view unit. The disparity between views is a measure indicating a difference in depth according to the user's view viewing a rendered layer stack according to the disclosure, and the second LF image 600 may be reconstructed according to the shifting parameter to which the disparity between views is applied for each user's view. That is, the second LF image 600 of FIG. 6A may include a plurality of image sets reconstructed by capturing at least one object included in the layer stack at different viewpoints. As an embodiment, the second LF image 600 may include a (2,2) view image reconstructed by capturing at least one object included in the layer stack at a front view (2,2). That is, the (2, 2) view image may be an image reconstructed by a user viewing a layer stack rendered through a stacked display apparatus from the front. In this case, because there is no difference in depth according to the front view between layers included in the layer stack, the disparity between views in the (2, 2) view image may be set to (0, 0). In addition, because the disparity between views of (0, 0) is applied to a first layer stack, the (2, 2) view image may be reconstructed without shifting the images in the layer stack.

In addition, the second LF image 600 may include a (0,0) view image 600-1 reconstructed by capturing at least one object included in the layer stack at a viewpoint separated from the front (2,2) by a −2 view interval on the y-axis and a −2 view interval on the x-axis. That is, the (0, 0) view image 600-1 may be an image reconstructed by the user viewing the layer stack rendered through the stacked display apparatus at a viewpoint separated from the front by a −2 view interval on the y-axis and a −2 view interval on the x-axis. In this case, the disparity between views between the layers included in the layer stack may be set to (2, 2). In addition, a front layer and a rear layer of the first layer stack may be shifted according to the disparity between views of (2, 2) in the first layer stack such that the (0, 0) view image 600-1 may be reconstructed.

In FIG. 6A, the second LF image is captured at 25 views and includes 25 reconstructed images, but is not limited thereto, and the second LF image may include (n*n) images such as 16, 36, 49, 64, etc.

In addition, in FIG. 6A, it has been described that the second LF image is reconstructed through only one layer stack, but is not limited thereto. That is, as an embodiment, the electronic apparatus 200 may reconstruct a 3-1th LF image through a first layer stack, reconstruct a 3-2th LF image through a second layer stack, reconstruct a 3-Nth LF image through an N-th layer stack, and obtain a plurality of third LF images including N LF image sets. Further, the electronic apparatus 200 may obtain one second LF image through the N LF images included in the plurality of third LF images. A method of obtaining one second LF image through N LF images included in a plurality of third LF images will be described later with reference to FIG. 7.

FIG. 6B is a diagram illustrating a method of reconstructing an LF image by shifting three images in a layer stack according to a view corresponding to each LF image. FIG. 6B shows three layer images 610, 620, and 630 included in the layer stack. The layer stack may include a rear layer image 610, an intermediate layer image 620, and a front layer image 630.

In addition, to perform training on the artificial intelligence model 20 according to an embodiment, the electronic apparatus 200 may apply a shifting parameter to each of the rear layer image 610, the intermediate layer image 620, and the front layer image 630 included in the layer stack according to a disparity between views and reconstruct the layer stack including the rear layer image 610, the intermediate layer image 620, and the front layer image 630 as a second LF image 600. In addition, the electronic apparatus may train the artificial intelligence model for performing factorization based on the reconstructed second LF image 600 and the first LF image.

According to the disclosure, a coefficient of a shifting parameter of each view image in an LF image may be determined according to disparity between views. As an embodiment, a (2, 2) view LF image indicating a front view is a view LF image moved +2 to the y-axis and +2 to the x-axis with respect to a (0, 0) view, and all layer images may not be shifted. That is, a reference point with respect to the shifting parameter coefficient is the (2, 2) view LF image of the front view, and in the (2, 2) LF view image, the disparity between views may be (0, 0). Further, according to the disclosure, the intermediate layer 620 is a layer that is a reference for shifting and may not be shifted. Therefore, the shifting parameter may not be applied to the intermediate layer 620. In addition, a coefficient of the shifting parameter Sn with respect to the rear layer 610 and the front layer 630 may change according to a view. As an embodiment, a disparity between views of (2, 2) is applied to the (0,0) view LF image 600-1 indicating the (0, 0) view, the coefficient of the shifting parameter Sn may be applied to the rear layer 610 as (−2, −2), and the coefficient of the shifting parameter Sn may be applied to the front layer 630 as (+2, +2). Therefore, the (0, 0) view LF image 600-1 may be an LF image generated by shifting the rear layer image 610-1 by (−2Sny, −2Snx), shifting the front layer image 630-1 by (+2Sny, +2Snx), and cropping the shifted rear layer image 610-1 and front layer image 630-1 and the intermediate layer image 620-1.

Snx according to the disclosure is a shifting parameter in the X-axis direction, Sny may be a shifting parameter in the Y-axis direction, and as an embodiment, values of Snx and Sny may be the same.

In addition, a disparity between views of (1, 2) may be applied to a (1, 0) view LF image 600-2 indicating the (1, 0) view. Therefore, the (1, 0) view LF image 600-2 may be a view LF image generated by shifting the rear layer 610-2 by (−Sny, −2Snx) and shifting the front layer 630 by (+Sny, +2Sny).

In addition, a disparity between views of (0, 2) may be applied to a (2,0) view LF image 600-3 indicating the (2, 0) view. Therefore, the (2, 0) view LF image 600-3 may be a view LF image generated by shifting the rear layer 610-3 by (0, −2Snx) and shifting the front layer 630-3 by (0, 2Snx). In addition, a disparity between views of (−1, 0) may be applied to a (3, 2) view LF image 600-6 indicating the (3, 2)

view. Therefore, the (3, 2) view LF image 600-6 may be a view LF image generated by shifting the rear layer 610-6 by (+Sny, 0), and shifting the front layer 630-6 by (−Sny, 0).

In FIG. 6B, it has been described that the layer stack includes the three layer images 610, 620, and 630, but the disclosure is not limited thereto, and the number of layer images included in the layer stack may change according to the performance of the electronic apparatus 200 that performs rendering or the number of panels of a stacked display apparatus.

Figure 7:
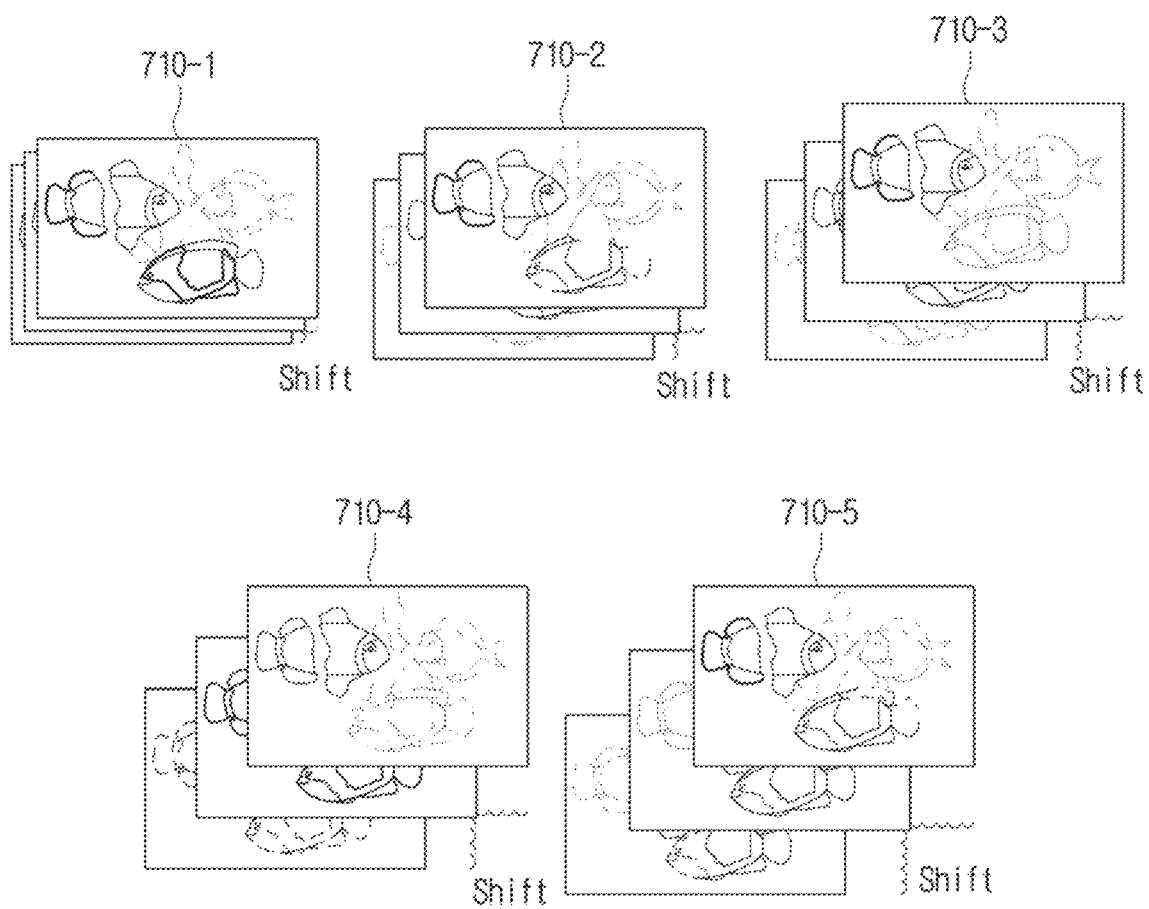
FIG. 7 is a diagram illustrating a process of reconstructing an LF image by applying different shifting parameters to a plurality of layer stacks respectively according to the disclosure.

FIG. 7 is a diagram illustrating a process of applying different shifting parameters to a plurality of first layer stacks respectively according to the disclosure. FIG. 7 shows shifting a rear layer of each of a first layer stack 710-1 to a fifth layer stack 710-5 by (sy,sx) and shifting a front layer thereof by (−sy, −sx) to generate the LF image of a (3,1) view of FIG. 6A through the first layer stack 710-1 to the fifth layer stack 710-5.

FIG. 7 illustrates a process of reconstructing a plurality of third LF images through the first layer stack 710-1 to the fifth layer stack 710-5 to train the artificial intelligence model 20. Referring to FIG. 7, a plurality of layer stacks may include the first layer stack 710-1 to the fifth layer stack 710-5. As an embodiment, the electronic apparatus 200 may reconstruct the first layer stack 710-1 to a 3-1th LF image, and reconstruct the second layer stack 710-2 to a 3-2th LF image.

In addition, a first shifting parameter shift 1 may be applied to the first layer stack 710-1 to obtain a (3,1) view LF image in a plurality of 3-1th LF images, and a second shifting parameter shift 2 may be applied to the second layer stack 710-2 to obtain a (3,1) view LF image in a plurality of 3-2th LF images. In addition, a fifth shifting parameter shift 5 may be applied to the fifth layer stack 710-5 to obtain a (3,1) view LF image in a plurality of 3-5th LF images. In addition, the electronic apparatus 200 may perform shifting on each of the first layer stack 710-1 to the fifth layer stack 710-5 by a disparity between viewpoints corresponding to each of a (0,0) view to a (4,4) view and obtain the 3-1th LF image to the 3-5th LF image.

In addition, the electronic apparatus may reconstruct a plurality of second LF images based on the 3-1th LF image to the 3-5th LF image. As an embodiment, the (3,1) view LF image in the second LF image may be reconstructed by averaging pixel values of the (3,1) view LF image in the 3-1th LF image to the (3,1) view LF image in the 3-5th LF image obtained as shown in FIG. 7.

Referring to FIG. 7, the first layer stack 710-1 may have a less degree of shifting than the fifth layer stack 710-5. That is, the size of the first shifting parameter shift 1 applied to the first layer stack 710-1 may be smaller than the size of the fifth shifting parameter shift 5 applied to the fifth layer stack 710-5.

According to the disclosure, one object among objects included in the plurality of layer stacks may be set as a reference object. In addition, the first layer stack 710-1 to which the first shifting parameter shift 1 is applied is a layer stack for clearly expressing the reference object, and the fifth layer stack 710-5 to which the fifth shifting parameter shift 5 is applied may be a layer stack for clearly expressing an object farthest from the reference object.

That is, the electronic apparatus may obtain shifting parameters as many as the number of layer stacks and apply the plurality of shifting parameters to the plurality of layer stacks, respectively, to obtain a plurality of third LF images with respect to the plurality of layer stacks respectively. In addition, the electronic apparatus may reconstruct the second LF image based on the plurality of third LF images.

Figure 8:
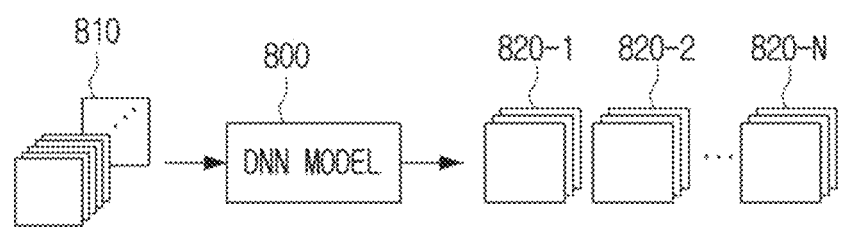
FIG. 8 is a diagram illustrating a process of applying an artificial intelligence model that is completely trained for performing factorization according to the disclosure.

FIG. 8 is a diagram illustrating a process of applying an artificial intelligence model that is completely trained for performing factorization according to the disclosure.

A model 800 of FIG. 8 may be a DNN model 800 that is completely trained for performing factorization based on a loss function described above in FIG. 4.

The electronic apparatus may input a first LF image 810 obtained by capturing at least one object at different viewpoints to the DNN model 800 that is completely trained and obtain a plurality of layer stacks 820-1 and 820-2, . . . , 820-N. The plurality of layer stacks 820-1, 820-2, . . . , 820-N are a plurality of layer stacks in which a shifting parameter indicating distance information between at least one object included in a first LF image 810 is reflected. The electronic apparatus may perform image rendering on the plurality of layer stacks 820-1, 820-2, . . . , 820-N through a time multiplexing technique of repeatedly reproducing a plurality of layer stacks at high speed, and thus there is no limit to an expressible depth range, and artifacts that may occur in image rendering on the layer stack may be removed.

The time multiplexing technique of repeatedly reproducing the plurality of layer stacks at high speed will be described with reference to FIGS. 9A to 9C.

Figure 9A:
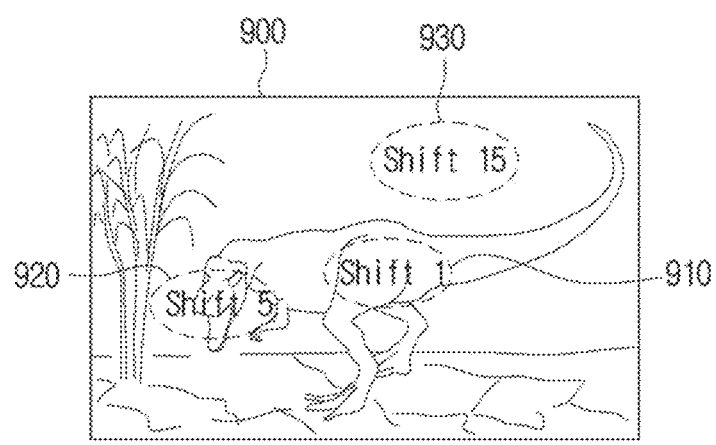
FIG. 9A is a diagram illustrating a shifting parameter according to an embodiment.

FIG. 9A is a diagram illustrating a shifting parameter according to an embodiment.

An image 900 of FIG. 9A may be the image 900 actually viewed when the electronic apparatus 200 performs image rendering on a plurality of layer stacks through a time multiplexing technique of repeatedly reproducing the plurality of layer stacks at high speed according to the disclosure.

As an embodiment, the image 900 may include three shifting parameters shift 1, shift 5, and shift 15. That is, the image 900 shown in FIG. 9A may be the image 900 in which image rendering of three layer stacks is performed through the time multiplexing technique of repeatedly reproducing three layer stacks at high speed. The electronic apparatus 200 may obtain the three shifting parameters through a first LF image captured at different viewpoints of objects included in the image 900. In this case, the number of shifting parameters may be three equal to the number of layer stacks.

For example, referring to FIG. 9A, a region near a region that is a reference of depth may be set as a region 910 having a shifting parameter of shift 1. That is, the electronic apparatus 200 may set a region corresponding to the dinosaur's thigh as the region that is the reference of depth through the first LF image obtained by capturing objects included in the image 900 at different viewpoints. A region near the dinosaur's thigh may be set as the region 910 having the shifting parameter of shift 1.

In addition, the electronic apparatus may set a region separated by a shifting parameter of shift 15 from the region 910 that is the reference of depth as a region 930 having the shifting parameter of shift 15. That is, referring to FIG. 9A, the region 930 separated by the shifting parameter of shift 15 from the region that is the reference of depth may be a region corresponding to the sky in the image 900.

In addition, the electronic apparatus may set a region separated by a shifting parameter of shift 5 from the region 910 that is the reference of depth as a region 920 having the shifting parameter of shift 5. That is, referring to FIG. 9A, the region 920 separated by the shifting parameter of shift 5 from the region that is the reference of depth may be a region corresponding to the dinosaur's head in the image 900.

According to an embodiment, the regions having the shifting parameters of shift 1 and shift 5 may be set in one dinosaur object included in the image 900. That is, in the above-described embodiment, it has been described as having one shifting parameter per object, but the disclosure is not limited thereto. A region having a plurality of shifting parameters may be set in one object included in an image. Also, according to an embodiment, a region having one shifting parameter may be set in a plurality of objects included in an image.

That is, as described above, the electronic apparatus 200 may obtain a plurality of shifting parameters based on depth information indicating distance information between at least one object included in the image 900. The electronic apparatus 200 may capture at least one object included in the image 900 of FIG. 9A at different viewpoints through an LF camera, obtain a first LF image, and obtain the plurality of shifting parameters based on the depth information about at least one object included in the first LF image.

Figure 9B:
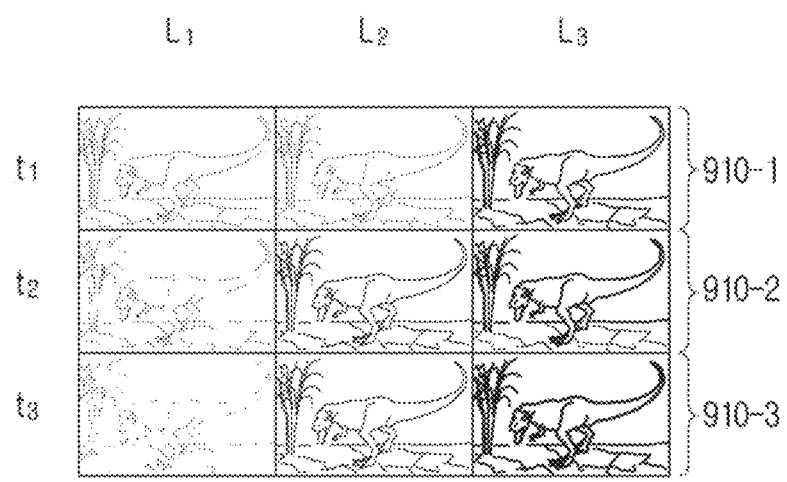
FIG. 9B is a diagram illustrating a plurality of layer stacks for applying time multiplexing according to an embodiment.

FIG. 9B is a diagram illustrating a plurality of layer stacks for applying time multiplexing according to an embodiment.

The electronic apparatus 200 may perform image rendering by using a time multiplexing technique of repeatedly reproducing a plurality of layer stacks 910-1, 910-2, and 910-3 shown in FIG. 9B at high speed, and provide the image 900 as shown in FIG. 9A. Referring to FIG. 9B, the plurality of layer stacks may include the first layer stack 910-1, the second layer stack 910-2, and the third layer stack 910-3. In addition, each of the plurality of layer stacks 910-1, 910-2, and 910-3 may include three layers L1, L2, and L3. According to an embodiment, the first layer stack 910-1, the second layer stack 910-2, and the third layer stack 910-3 may be layer stacks obtained by inputting a first LF image to an artificial intelligence model that is completely trained. The first layer stack 910-1 may be a layer stack to which the shifting parameter of shift 1 is applied in the first LF image, and the second layer stack 910-2 may be a layer stack to which the shifting parameter of shift 5 is applied in the first LF image. In addition, the third layer stack 910-3 may be a layer stack to which the shift parameter of shift 15 is applied in the first LF image.

Figure 9C:
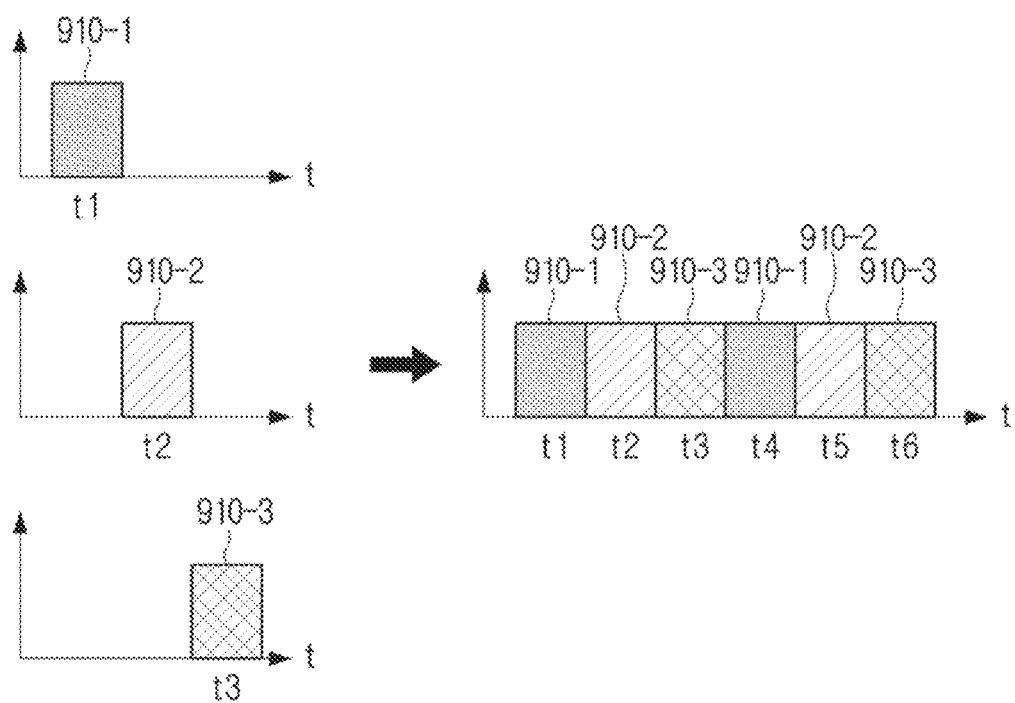
FIG. 9C is a diagram illustrating a method of performing time multiplexing according to an embodiment.

FIG. 9C is a diagram illustrating a method of performing time multiplexing according to an embodiment.

As shown in FIG. 9C, the electronic apparatus 200 may render and display three layers included in the first layer stack 910-1 on each panel of a stacked display at a time t1, and render and display three layers included in the second layer stack 910-2 on each panel of the stacked display at a time t2. Further, the electronic apparatus 200 may render and display three layers included in the third layer stack 910-3 on each panel of the stacked display at a time t3. Further, the electronic apparatus 200 may render and display the three layers included in the first layer stack 910-1 on each panel of the stacked display at a time t4, render and display the three layers included in the second layer stack 910-2 on each panel of the stacked display at a time t5, and render and display the three layers included in the third layer stack 910-3 on each panel of the stacked display at a time t6, thereby repeatedly reproducing a plurality of layer stacks at high speed. That is, the electronic apparatus 200 may repeatedly reproduce the plurality of layer stacks at high speed in a period of t1 to t3.

That is, as described above with reference to FIGS. 9A to 9C, the electronic apparatus may perform image rendering using time multiplexing based on the plurality of layer stacks to which a shifting parameter is applied, thereby displaying an image reflecting depth information of at least one object included in a plurality of LF images.

Figure 10:
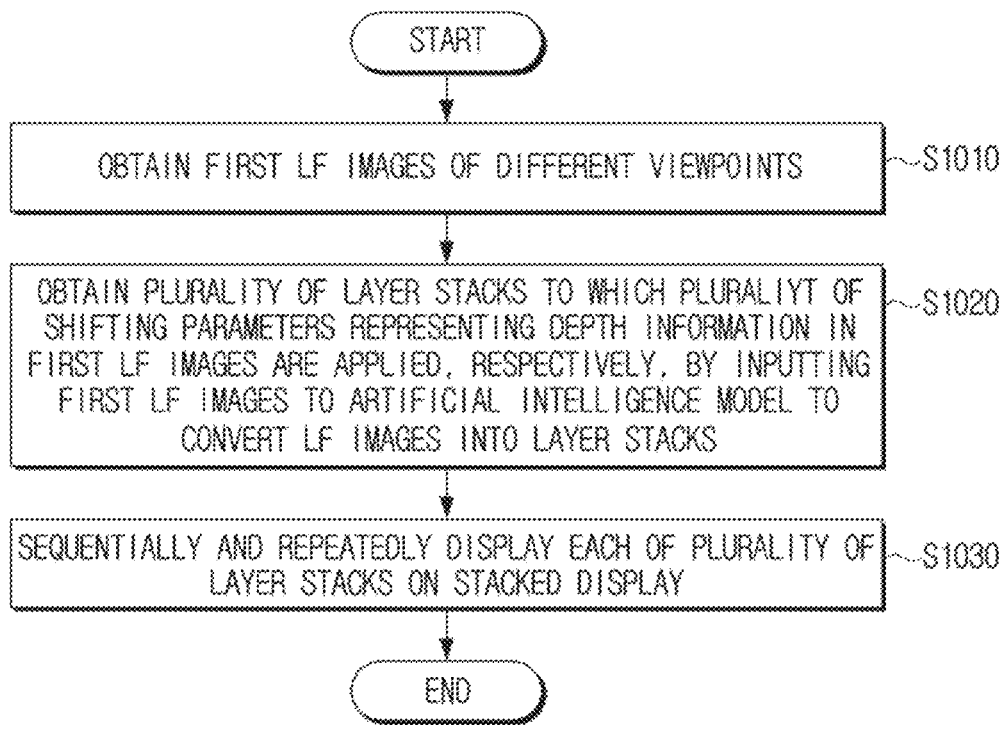
FIG. 10 is a flowchart illustrating a control method of an electronic apparatus according to an embodiment.

FIG. 10 is a flowchart illustrating a control method of an electronic apparatus according to an embodiment.

Referring to FIG. 10, first, the electronic apparatus 200 may obtain first LF images of different viewpoints (S1010). The first LF images may be a plurality of LF images obtained by capturing at least one object at different viewpoints.

In addition, the electronic apparatus 200 may input the first LF image to an artificial intelligence model for converting an LF image into a layer stack, and obtain a plurality of layer stacks to which a plurality of shifting parameters indicating depth information in the first LF images are respectively applied (S1020).

According to an embodiment, the electronic apparatus 200 may obtain depth information about at least one object included in the plurality of first LF images through a stereo matching technique, and obtain the plurality of shifting parameters based on the obtained depth information.

In addition, as an embodiment, the electronic apparatus 200 may input the first LF images and the plurality of shifting parameters to the artificial intelligence model and obtain the plurality of layer stacks.

The artificial intelligence model for converting the LF image into the layer stack may be a deep neural network (DNN) model, a non-negative tensor factorization (NTF) model, or a non-negative metric factorization (NMF) model. Further, each of the plurality of layer stacks may be a layer stack for clearly expressing one object among at least one object included in the plurality of first LF images, and each of the plurality of first layer stacks may include a plurality of layers. According to an embodiment, the number of the plurality of shifting parameters may be the same as the number of the plurality of layer stacks.

Further, the electronic apparatus 200 may sequentially and repeatedly display the plurality of layer stacks on a stacked display (S1030), thereby performing image rendering on the plurality of layer stacks.

Through the above-described process, the electronic apparatus may generate a plurality of layer stacks reflecting depth information of at least one object included in an LF image based on a trained artificial intelligence model, and thus there is no limit of an expressible depth range and artifacts that may occur in image rendering on the layer stack may be removed.

Figure 11:
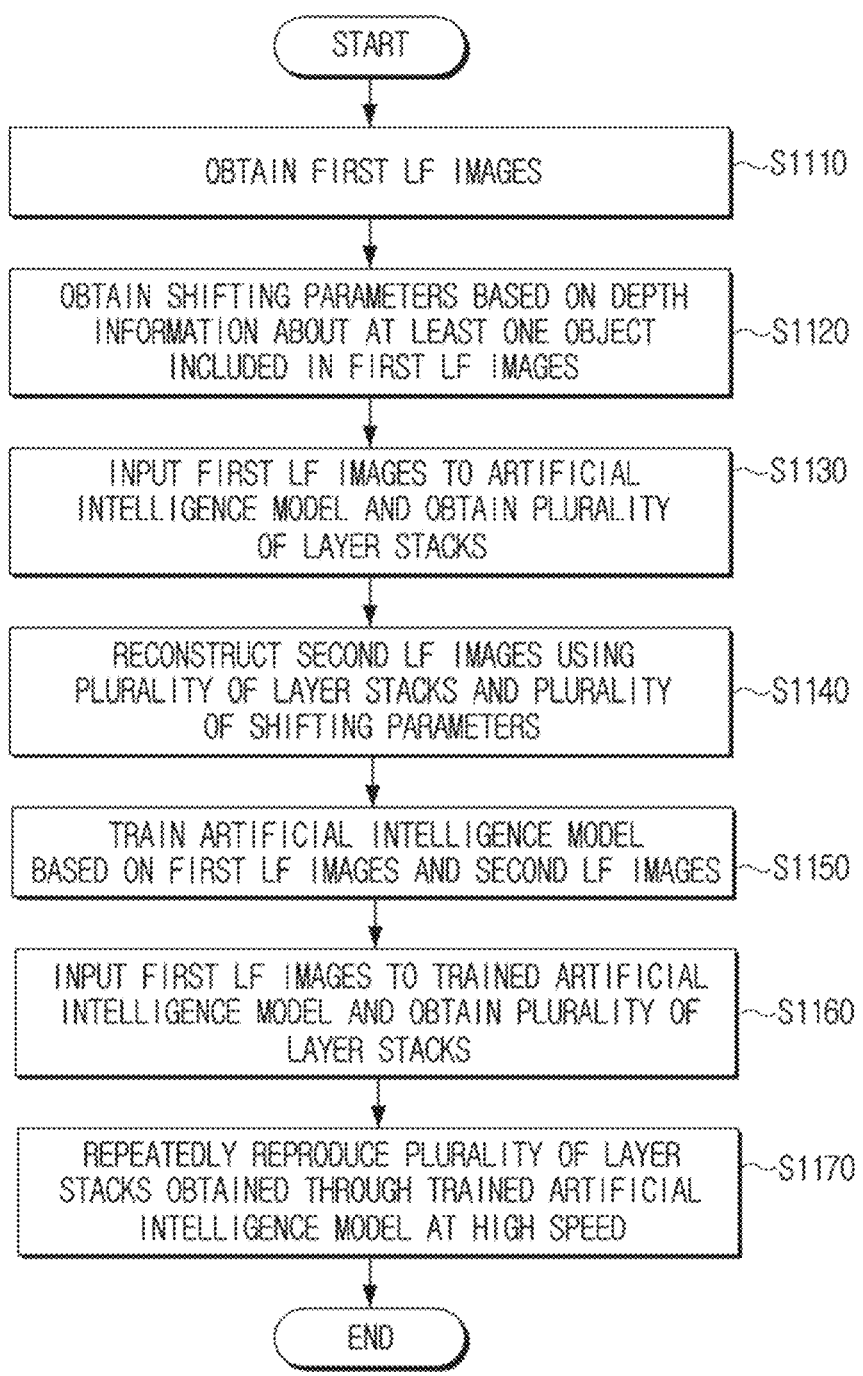
FIG. 11 is a flowchart illustrating a method of training an artificial intelligence model for performing a trained factorization according to an embodiment.

FIG. 11 is a flowchart illustrating a method of training an artificial intelligence model for performing a trained factorization according to an embodiment.

Referring to FIG. 11, first, the electronic apparatus 200 may obtain a first LF image (S1110).

Further, the electronic apparatus 200 may obtain a plurality of shifting parameters based on depth information about at least one object included in the first LF image (S1120). According to an embodiment, the electronic apparatus may obtain depth information about at least one object included in the first LF image through a stereo matching technique, and obtain a plurality of shifting parameters based on the obtained depth information.

Further, the electronic apparatus 200 may input the first LF image to the artificial intelligence model and obtain a plurality of layer stacks (S1130).

Further, the electronic apparatus 200 may reconstruct a second LF image using the plurality of layer stacks and the plurality of shifting parameters (S1140). The second LF images are a plurality of LF images for training the artificial intelligence model.

Further, the electronic apparatus 200 may train the artificial intelligence model based on the first LF image and the second LF image (S1150). The electronic apparatus 200 may compare the second LF image with the first LF image to obtain information about the image quality of the second LF image, and train the artificial intelligence model based on the obtained information about the image quality. According to an embodiment, information about the image quality of the second LF image may be obtained through a loss function. According to an embodiment, the electronic apparatus 200 may repeatedly perform a process of S1130 to S1150 described above and continue to train the artificial intelligence model.

Further, the electronic apparatus 200 may input the first LF image to the artificial intelligence model that is completely trained and obtain a plurality of layer stacks (S1160).

Further, the electronic apparatus 200 may repeatedly reproduce the plurality of layer stacks obtained through the trained artificial intelligence model (S1170) and perform image rendering on the plurality of layer stacks.

Although general terms widely used in the embodiment are selected to describe embodiments in consideration of the functions thereof, these general terms may vary according to intentions of one of ordinary skill in the art, case precedents, the advent of new technologies, and the like. Terms arbitrarily selected by the applicant of the embodiments may also be used in a case. In this case, their meanings are given in the detailed description of the embodiments. Hence, these terms may be defined based on their meanings and the contents of the entire specification, not by simply stating the terms.

It may be understood that the description disclosed in this specification is not limited to an embodiment and that modification, equivalent, and/or alternative on the various embodiments described herein are included in the contents of this specification. With regard to description of drawings, similar elements may be marked by similar reference numerals.

In this specification, the expressions "have," "may have," "include" and "comprise," or "may include" and "may comprise" used herein indicate existence of corresponding features (e.g., elements such as numeric values, functions, operations, or components) but do not exclude presence of additional features.

In this specification, the expressions "A or B," "at least one of A or/and B," "one or more of A or/and B," and the like may include all combinations of the associated listed items. For example, the term "A or B," "at least one of A and B," or "at least one of A or B" may refer to all of the case (1) in which at least one A is included, the case (2) in which at least one B is included, or the case (3) in which both of at least one A and at least one B are included. The terms such as "first," "second," and the like used herein may refer to various elements regardless of the order and/or priority of the elements and may be used to distinguish an element from another element, not to limit the elements.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it may be understood that there are no intervening element (e.g., a third element).

According to the situation, the expression "configured to" used herein may be used as, for example, the expression "suitable for," "having the capacity to," "designed to," "adapted to," "made to," or "capable of" The term "configured to" may not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

The term "unit" or "module" used in the disclosure includes a unit configured as hardware, software, or firmware, and may be interchangeably used with, for example, terms such as logic, logical block, component, or circuit. The "unit" or "module" may be a minimum unit or a portion of an integrally formed component or a portion performing one or more functions. For example, the module may be configured as an application-specific integrated circuit (ASIC).

Various embodiments of the disclosure may be implemented as software including instructions stored in a machine-readable storage medium (e.g., a computer). The machine is a device capable of calling the stored instructions from a storage medium and operating according to the called instructions, and may include an electronic apparatus (e.g., the display apparatus 100) according to the embodiments. When the instruction is executed by a processor, the processor may perform a function corresponding to the instruction directly or by using other components under the control of the processor. The instruction may include code generated or executed by a compiler or an interpreter. The machine-readable storage medium may be provided in the form of a non-transitory storage medium. Here, 'non-transitory' means that the storage medium does not include a signal and is tangible, but does not distinguish semi-permanent or temporary storage of data in the storage medium.

The method according to various embodiments of the disclosure may be provided by being included in a computer program product. The computer program product may be traded between sellers and buyers as commodity. The computer program product may be distributed in the form of machine-readable storage medium (e.g., compact disc read only memory (CD-ROM)) or through an application store (e.g., Play Store™) online. In case of online distribution, at least a part of the computer program product may be temporarily stored or temporarily generated in a storage medium such as a server of a manufacturer, a server of an application store, or a memory of a relay server.

Each of the elements (e.g., a module or a program) according to various embodiments may include a singular entity or plural entities, and some sub-elements of the above-described sub-elements may be omitted, or other sub-elements may be further included in various embodiments. Alternatively or additionally, some elements (e.g., a module or a program) may be integrated into a single entity to perform functions performed by each corresponding element prior to integration identically or similarly. Operations performed by modules, programs, or other elements according to various embodiments may be sequentially, in parallel, repeatedly or heuristically executed, or at least some operations may be executed in a different order or omitted, or other operations may be added.

What is claimed is:

1. An electronic apparatus comprising:
a stacked display comprising a plurality of panels; and
a processor configured to:
obtain first light field (LF) images of different viewpoints,
obtain a plurality of shifting parameters based on depth information in the first LF images,
input the first LF images and the obtained plurality of shifting parameters to an artificial intelligence model for converting an LF image into a layer stack, to obtain a first plurality of layer stacks to which the plurality of shifting parameters are respectively applied, and
reconstruct second LF images using the first plurality of layer stacks and the plurality of shifting parameters,
train the artificial intelligence model based on the first LF images and the second LF images,
input the first LF images to the trained artificial intelligence model to obtain a second plurality of layer stacks, and
control the stacked display to sequentially and repeatedly display, on the stacked display, the second plurality of layer stacks.

2. The electronic apparatus as claimed in claim 1, wherein the second plurality of layer stacks comprise a first layer stack to which a first shifting parameter indicating first depth information in the first LF images is applied, and a second layer stack to which a second shifting parameter indicating second depth information in the first LF images is applied, and
wherein the first layer stack is for displaying a region corresponding to the first depth information in the first LF images, and the second layer stack is for displaying a region corresponding to the second depth information in the first LF images.

3. The electronic apparatus as claimed in claim 2, wherein the second plurality of layer stacks further comprise a third layer stack, and
wherein the processor is configured to sequentially and repeatedly display, on the stacked display, the first layer stack, the second layer stack, and the third layer stack.

4. The electronic apparatus as claimed in claim 1, wherein the processor is configured to:
compare the first LF images and the second LF images to obtain a loss function, and
train the artificial intelligence model, based on the loss function.

5. The electronic apparatus as claimed in claim 4, wherein the processor is configured to:
respectively apply the plurality of shifting parameters to the first plurality of layer stacks, to obtain a plurality of third LF images respectively with respect to the first plurality of layer stacks, and
reconstruct the second LF images based on the obtained plurality of third LF images.

6. The electronic apparatus as claimed in claim 4, wherein the artificial intelligence model is implemented as one among a deep neural network (DNN) model, a non-negative tensor factorization (NTF) model, and a non-negative metric factorization (NMF) model.

7. The electronic apparatus as claimed in claim 6, wherein, based on the artificial intelligence model being the DNN model, a weight of the DNN model is updated by the obtained loss function.

8. The electronic apparatus as claimed in claim 6, wherein, based on the artificial intelligence model being one among the NTF model and the NMF model, a parameter of the artificial intelligence model is updated by the obtained loss function.

9. The electronic apparatus as claimed in claim 1, wherein the depth information is obtained from the first LF images by a stereo matching technique, and the plurality of shifting parameters are obtained based on the obtained depth information.

10. The electronic apparatus as claimed in claim 1, wherein a number of the plurality of shifting parameters is a same as a number of the first plurality of layer stacks.

11. A control method of an electronic apparatus, the control method comprising:
obtaining first light field (LF) images of different viewpoints;
obtaining a plurality of shifting parameters based on depth information in the first LF images;
inputting the first LF images and the plurality of shifting parameters to an artificial intelligence model for converting an LF image into a layer stack, to obtain a first plurality of layer stacks to which the plurality of shifting parameters are respectively applied; and
reconstructing second LF images using the first plurality of layer stacks and the plurality of shifting parameters;
training the artificial intelligence model based on the first LF images and the second LF images;
inputting the first LF images to the trained artificial intelligence model to obtain a second plurality of layer stacks; and
sequentially and repeatedly displaying, on a stacked display, the second plurality of layer stacks.

12. The control method as claimed in claim 11, wherein the second plurality of layer stacks comprise a first layer stack to which a first shifting parameter indicating first depth information in the first LF images is applied, and a second layer stack to which a second shifting parameter indicating second depth information in the first LF images is applied, and
wherein the first layer stack is for displaying a region corresponding to the first depth information in the first LF images, and the second layer stack is for displaying a region corresponding to the second depth information in the first LF images.

13. The control method as claimed in claim 12, wherein the second plurality of layer stacks further comprise a third layer stack, and
wherein the displaying comprises sequentially and repeatedly displaying, on the stacked display, the first layer stack, the second layer stack, and the third layer stack.

14. The control method as claimed in claim 11, further comprising:
comparing the first LF images and the second LF images to obtain a loss function; and
training the artificial intelligence model, based on the loss function.

15. The control method as claimed in claim 14, wherein the reconstructing of the second LF images further comprises:
respectively applying the plurality of shifting parameters to the first plurality of layer stacks, to obtain a plurality of third LF images respectively with respect to the first plurality of layer stacks; and
reconstructing the second LF images based on the obtained plurality of third LF images.

16. The control method as claimed in claim 14, wherein the artificial intelligence model is implemented as one among a deep neural network (DNN) model, a non-negative tensor factorization (NTF) model, and a non-negative metric factorization (NMF) model.

17. The control method as claimed in claim 16, wherein, based on the artificial intelligence model being the DNN model, a weight of the DNN model is updated by the loss function.

18. The control method as claimed in claim 16, wherein, based on the artificial intelligence model being one among the NTF model and the NMF model, a parameter of the artificial intelligence model is updated by the obtained loss function.

19. The control method as claimed in claim 11, wherein the depth information is obtained from the first LF images by a stereo matching technique, and the plurality of shifting parameters are obtained based on the obtained depth information.

20. The control method as claimed in claim 11, wherein a number of the plurality of shifting parameters is a same as a number of the first plurality of layer stacks.

21. A non-transitory computer-readable storage medium storing instructions, when executed by a processor, cause the processor to perform the control method of claim 11.

22. A method of training an artificial intelligence model for performing a trained factorization, the method comprising:

obtaining a first LF image;
obtaining a plurality of shifting parameters, based on depth information about at least one object included in the obtained first LF image;
inputting the obtained first LF image to the artificial intelligence model to obtain a plurality of layer stacks;
reconstructing a second LF image, using the obtained plurality of layer stacks and the obtained plurality of shifting parameters;
training the artificial intelligence model, based on the obtained first LF image and the reconstructed second LF image;
inputting the obtained first LF image to the trained artificial intelligence model to obtain the plurality of layer stacks; and
repeatedly reproducing and performing image rendering on the plurality of layer stacks obtained through the trained artificial intelligence model.

23. The method of claim 22, further comprising obtaining the depth information about the at least one object included in the obtained first LF image, through a stereo matching technique.

24. The method of claim 22, wherein the training comprises:

comparing the reconstructed second LF image with the obtained first LF image to obtain a loss function;
obtaining information about an image quality of the second LF image, based on the obtained loss function; and
training the artificial intelligence model based on the obtained information about the image quality.

25. A non-transitory computer-readable storage medium storing instructions, when executed by a processor, cause the processor to perform the method of claim 22.

* * * * *